United States Patent
Huang et al.

(10) Patent No.: US 10,972,953 B2
(45) Date of Patent: *Apr. 6, 2021

(54) DUAL SIM DUAL STANDBY USER EQUIPMENT RAT SELECTION

(71) Applicant: Mediatek Inc., Hsin-Chu (TW)

(72) Inventors: Jen-Ping Huang, Hsinchu (TW); Chien-Chun Huang-Fu, Hsinchu (TW); Pi-Yuan Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,748

(22) Filed: May 8, 2020

(65) Prior Publication Data
US 2020/0267619 A1    Aug. 20, 2020

Related U.S. Application Data

(63) Continuation of application No. 16/156,089, filed on Oct. 10, 2018, now Pat. No. 10,681,604.

(Continued)

(51) Int. Cl.
| | |
|---|---|
| *H04W 36/14* | (2009.01) |
| *H04W 76/15* | (2018.01) |
| *H04W 76/25* | (2018.01) |
| *H04W 48/18* | (2009.01) |
| *H04W 36/00* | (2009.01) |
| *H04W 76/22* | (2018.01) |
| *H04W 88/06* | (2009.01) |

(52) U.S. Cl.
CPC ........ *H04W 36/14* (2013.01); *H04W 36/0011* (2013.01); *H04W 36/0027* (2013.01); *H04W 48/18* (2013.01); *H04W 76/15* (2018.02); *H04W 76/22* (2018.02); *H04W 76/25* (2018.02); *H04W 36/0022* (2013.01); *H04W 88/06* (2013.01)

(58) Field of Classification Search
CPC ............. H04W 36/14; H04W 36/0011; H04W 36/0027; H04W 36/0022; H04W 76/22; H04W 76/25; H04W 48/18; H04W 88/06
USPC ........................................................ 455/436
See application file for complete search history.

(56) References Cited

U.S. PATENT DOCUMENTS

| | | | | |
|---|---|---|---|---|
| 2014/0376511 | A1* | 12/2014 | Kalapatapu | H04L 65/1016 370/331 |
| 2015/0208446 | A1* | 7/2015 | Yeoum | H04L 65/1046 370/329 |

(Continued)

*Primary Examiner* — Farid Seyedvosoghi
(74) *Attorney, Agent, or Firm* — Locke Lord LLP; Tim Tingkang Xia, Esq.

(57) ABSTRACT

A UE determines a set of RATs available in accordance with a first subscriber identity associated with a first network and a second subscriber identity associated with a second network. When the set includes a first RAT accessing a base station in the first network, a second RAT accessing a base station in the second network, and a third RAT accessing an access point of a WLAN, the UE selects, in a first performance configuration, the first RAT to establish a first call under the first subscriber identity. The UE further communicates, under the first subscriber identity, with a first IMS server of the first network through the first RAT to establish the first call. The UE maintains, under the second subscriber identity, a connection with a second IMS server of the second network through the first RAT or the third RAT when the first call is active.

20 Claims, 26 Drawing Sheets

Related U.S. Application Data

(60) Provisional application No. 62/570,688, filed on Oct. 11, 2017.

(56) References Cited

U.S. PATENT DOCUMENTS

| | | | |
|---|---|---|---|
| 2016/0219421 A1* | 7/2016 | Shi | H04W 4/16 |
| 2018/0227383 A1* | 8/2018 | Vasanthasenan | H04W 76/10 |
| 2018/0332428 A1* | 11/2018 | Gupta | H04L 61/1564 |

* cited by examiner

DUAL SIM DUAL STANDBY USER EQUIPMENT RAT SELECTION

CROSS-REFERENCE TO RELATED APPLICATION(S)

This application is a continuation of U.S. patent application Ser. No. 16/156,089 entitled "DUAL SIM DUAL STANDBY USER EQUIPMENT RAT SELECTION" and filed on Oct. 10, 2018, which claims the benefits of U.S. Provisional Application Ser. No. 62/570,688, entitled "DSDS UE SUPPORT DA" and filed on Oct. 11, 2017. All of the applications referenced above are hereby incorporated by reference in their entireties.

BACKGROUND

Field

The present disclosure relates generally to communication systems, and more particularly, to techniques for selecting a radio access technology (RAT) on a dual SIM dual standby user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines a set of radio access technologies (RATs) available to the UE in accordance with a first subscriber identity associated with a first network and a second subscriber identity associated with a second network. When the set includes a first RAT accessing a base station in the first network, a second RAT accessing a base station in the second network, and a third RAT accessing an access point of a wireless local area network (WLAN), the UE selects, in a first performance configuration, the first RAT to establish a first call under the first subscriber identity. The UE further communicates, under the first subscriber identity, with a first IP Multimedia Subsystem (IMS) server of the first network through the first RAT to establish the first call. The UE maintains, under the second subscriber identity, a connection with a second IMS server of the second network through the first RAT or the third RAT when the first call is active.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
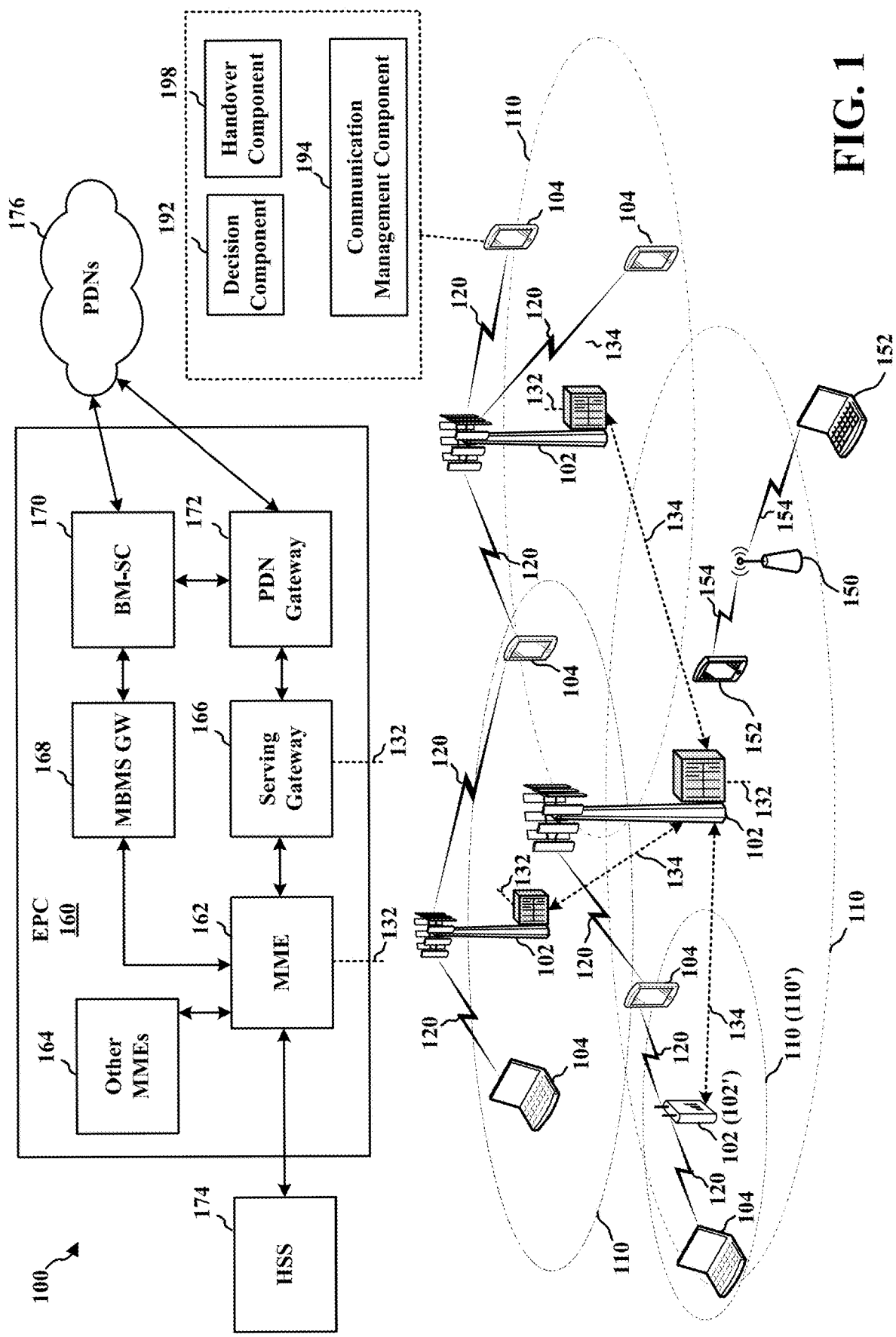
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network (e.g. Evolved Packet Core (EPC), 5G CN) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a decision component 192, a communication management component 194, and a handover component 198. The decision component 192 determine a set of RATs available to the UE 702 in accordance with a first subscriber identity associated with a first network and a second subscriber identity associated with a second network. The decision component 192 determines whether the set includes a first RAT accessing a base station in the first network, a second RAT accessing a base station in the second network, and a third RAT accessing an access point of a WLAN. When the set includes a first RAT accessing a base station in the first network, a second RAT accessing a base station in the second network, and a third RAT accessing an access point of a WLAN, the communication management component 194 communicates, under the first subscriber identity, with a first IP Multimedia Subsystem (IMS) server of the first network through the first RAT to establish the first call. The communication management component 194 maintains, under the second subscriber identity, a connection with a second IMS server of the second network through the first RAT or the third RAT when the first call is active.

Figure 2:
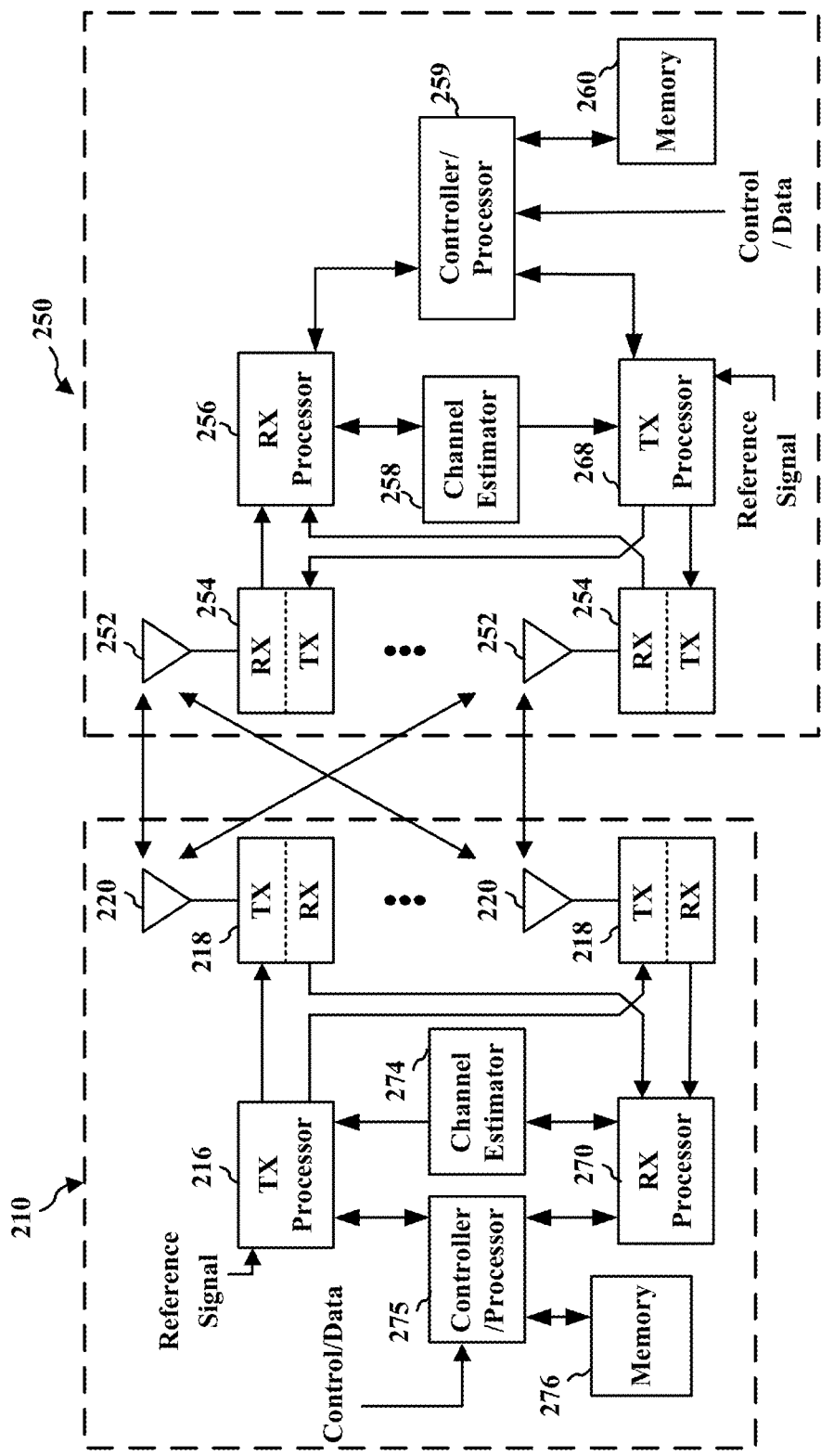
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
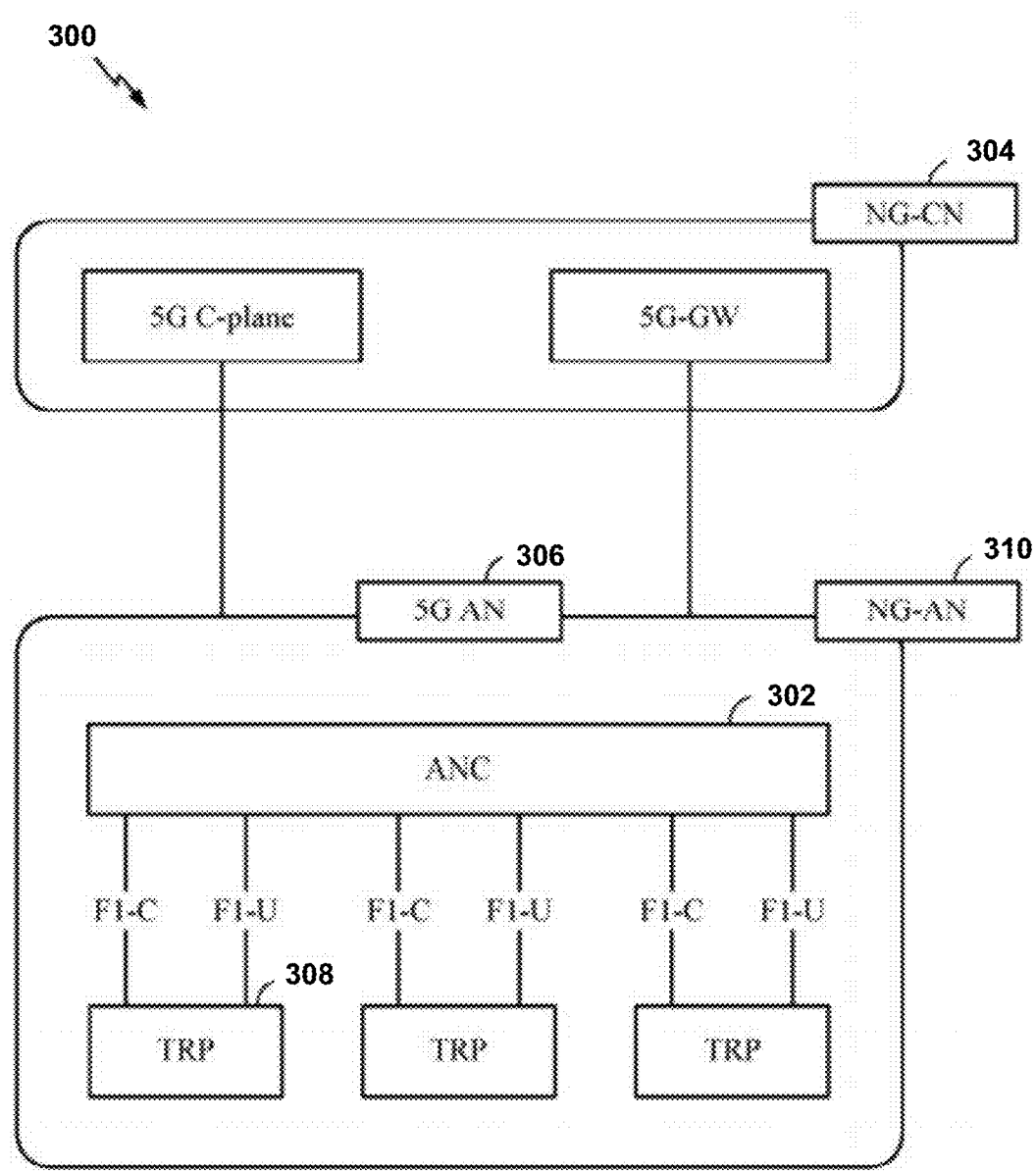
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
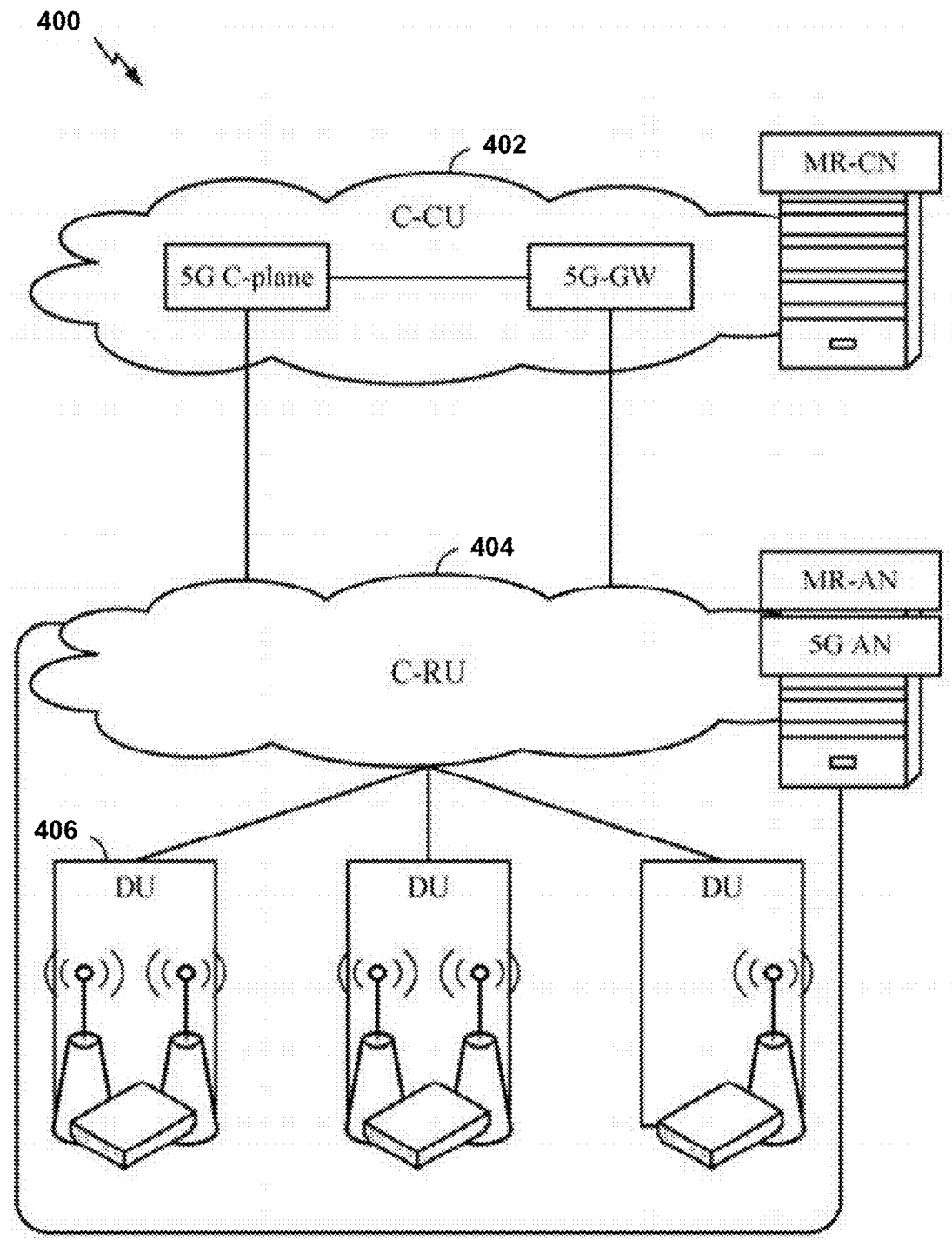
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
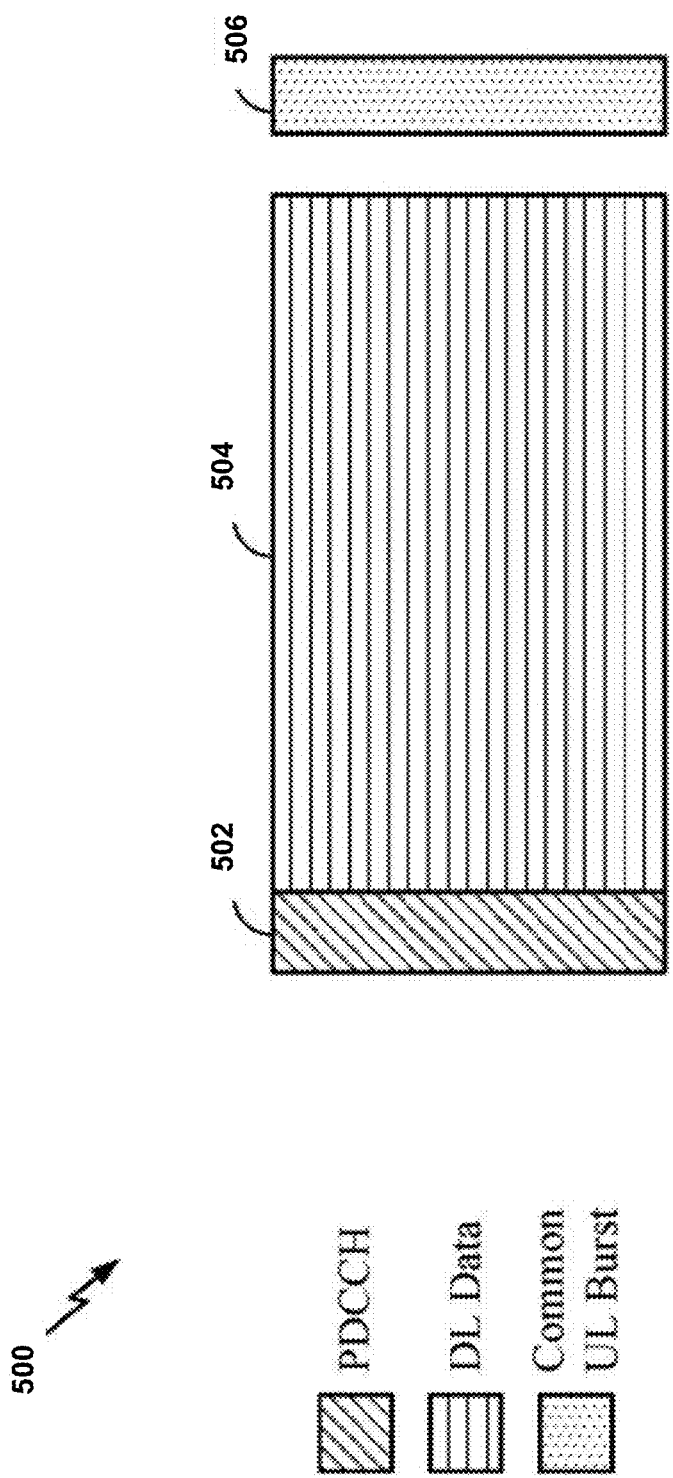
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
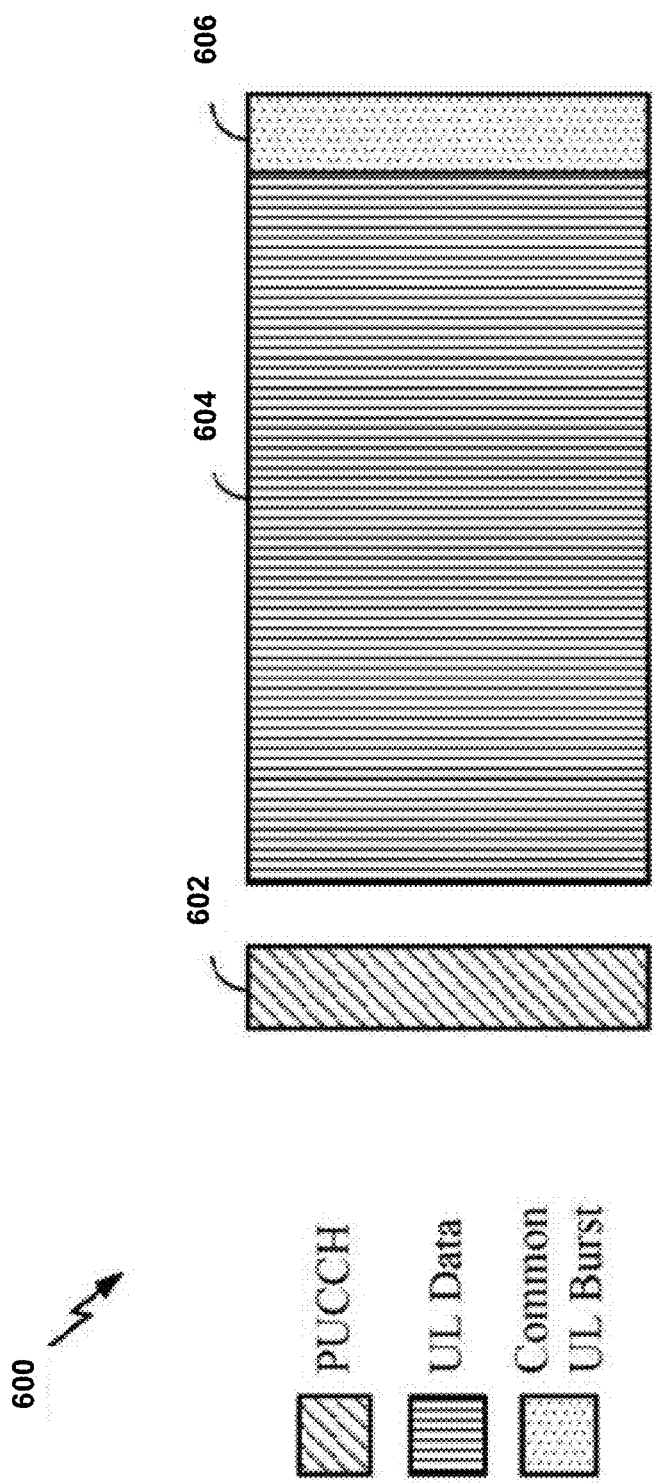
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Recently there has been a propagation of calls using Voice over Long Term Evolution (VOLTE) standards. That, combined with the continued increase in cellular network telecommunications traffic, has incentivized some service providers to offer calling through Wi-Fi connections in accordance with the various IEEE 802.11 standards. Such Wi-Fi offloading, as it is called, enables telecommunications calls and data from a UE to be offloaded from the cellular network to the internet for transport from the UE to the termination destination point and vice versa. Such Wi-Fi networks may be either generally secure, operator controlled networks, known as trusted networks, or generally unsecured, publicly accessible Wi-Fi networks through public hotspots and the like, known as untrusted networks.

Besides, the IP Multimedia Subsystem (IMS) is technology that merges the internet with the cellular world. It makes internet technology such as the web, email, instant messaging, user presence, video conferencing and so forth available in nearly any location. The IMS is a key element in 3G (and beyond) architecture that makes it possible to provide ubiquitous access to all services that the internet provides. For example, it enables one to access their favorite web pages, read their email, watch a movie or take part in the video conference wherever one is by simply using a mobile device and accessing the desired services.

Generally, the IMS combines the latest trends in packet switch technology and circuit switch technology to make a mobile internet available. It also creates a common platform to develop various multimedia services and creates a mechanism to boost margins for service providers due to extra usage of mobile packet switch networks. There are various protocols used in the IMS which include the session control protocol, and a SIP as well as other protocols known to those of skill in the art that are utilized for providing the multimedia services. The IMS architecture is a collection of functions linked by standardized interfaces. Most venders follow the IMS architecture closely and implement each function in a single node although other nodes may be used.

Figure 7:
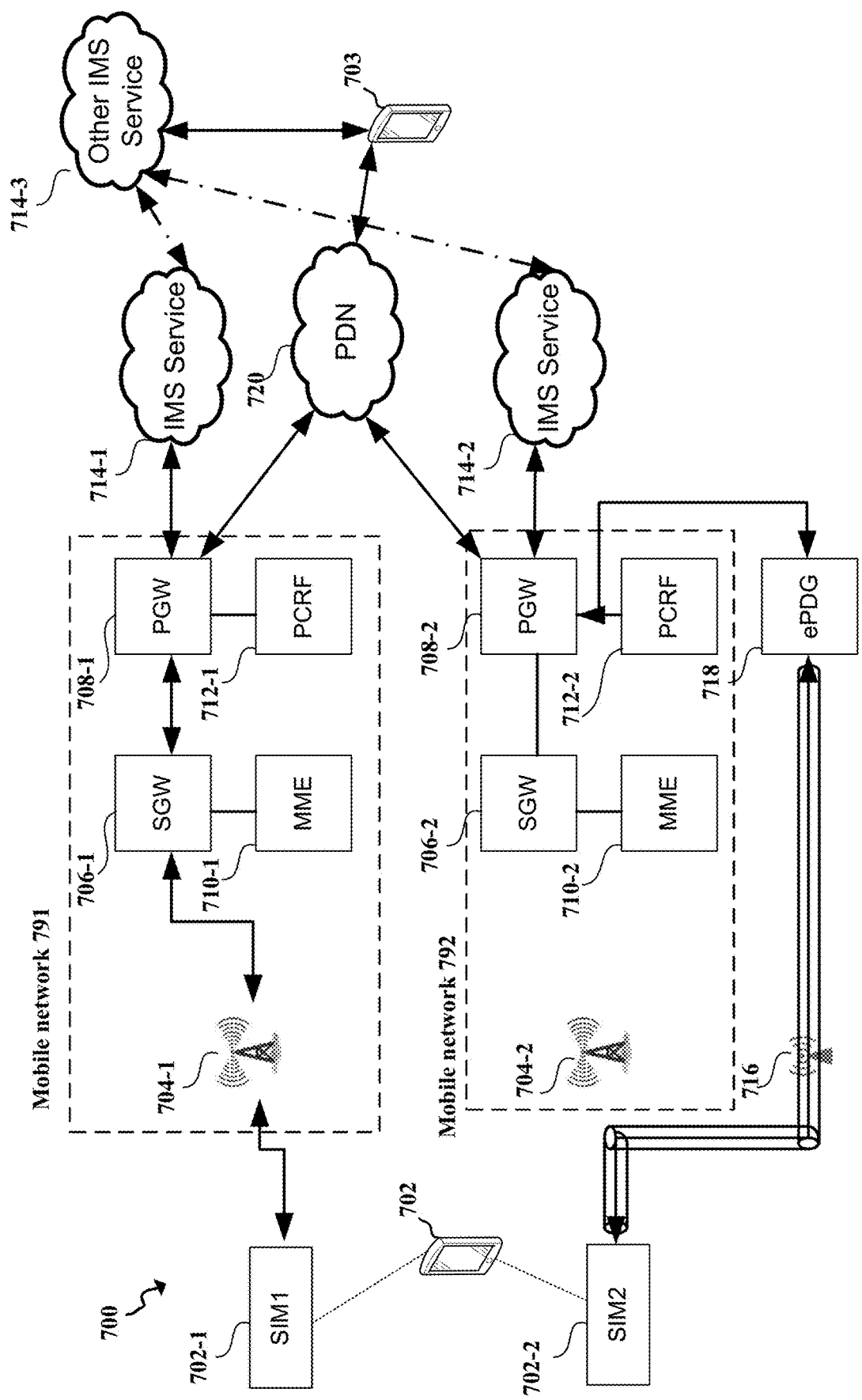
FIG. 7 is a diagram 700 illustrating communications between a UE and another UE through different radio access technologies (RATs).

FIG. 7 is a diagram 700 illustrating communications between a UE 702 and another UE 703 through different mobile network with corresponding radio access technologies (RATs). Subscriber identity module (SIM), widely known as a SIM card, is an integrated circuit that is intended to securely store the international mobile subscriber identity (IMSI) number and its related key, which are used by a network to identify and authenticate subscribers on a UE like the UE 702 and 703. A device may have multiple subscriber identity module (SIM). In this example, the UE 702, a multi-SIM device, has two SIMs: SIM1 702-1 and SIM2 702-2. Typically, different SIMs correspond to different cellular network operators. In this example, the SIM1 702-1 corresponds to a mobile network 791 while SIM 2 702-2 corresponds to a mobile network 792. In other words, the UE 702 can operates as a subscriber of the mobile network 791 utilizing identity information provided by the SIM1 702-1.

Alternatively, the UE 702 can operates as a subscriber of the mobile network 792 utilizing identity information provided by the SIM1 702-2. The mobile network 791 may include, among other components, a base station 704-1, a serving gateway 706-1, a PDN gateway 708-1, a mobility management entity (MME) 710-1 and a policy and charging rules function (PCRF) 712-1. The mobile network 791 is associated with an IMS service 714-1. The PDN gateway 708-1 is connected to both the IMS service 714-1 and the PDN 720. Similarly, the mobile network 792 includes, among other components, a base station 704-2, a serving gateway 706-2, a PDN gateway 708-2, a MME 710-2 and a PCRF 712-2. The mobile network 792 is associated with an IMS service 714-2. The PDN gateway 708-2 is connected to both the IMS service 714-2 and the PDN 720. On the other hand, the UE 703 is connected, in the same way, to an IMS service 714-3 and the PDN 720. The IMS service 714-1, the IMS service 714-2, and the IMS services 714-3 can communicate with each other.

Therefore, the UE 702 and the UE 703 can communicate with each other via various routes. For example, the UE 702 can communicate with the UE 703 in an IMS call via the mobile network 791 corresponding to SIM1 702-1. More specifically, the signaling path may be from the UE 702 through the base station 704-1, the serving gateway 706-1, the PDN gateway 708-1, the IMS service 714-1, the IMS services 714-3, eventually to the UE 703, and vice versa. The data traffic path may be from the UE 702 through the base station 704-1, the serving gateway 706-1, the PDN gateway 708-1, the PDN 720, eventually to the UE 703, and vice versa.

In another example, the UE 702 can communicate with the UE 703 in an IMS call via the mobile network 792 corresponding to SIM2 702-2. More specifically, the signaling path may be from the UE 702 through the base station 704-2, the serving gateway 706-2, the PDN gateway 708-2, the IMS service 714-2, the IMS services 714-3, eventually to the UE 703, and vice versa. The data traffic path may be from the UE 702 through the base station 704-2, the serving gateway 706-2, the PDN gateway 708-2, the PDN 720, eventually to the UE 703, and vice versa.

In yet another example, the UE 702 may use an untrusted access network (such as a WLAN network 716, which may be a Wi-Fi network) to communicate with the PDN gateway 708-2 of the mobile network 792 through a security gateway such as an ePDG 718. The ePDG 718 is one of the elements of core network. The ePDG 718 plays a role of a security node for an untrusted access network (such as a WLAN network 716). In various configurations, the UE 702 may establish a secure tunnel over the WLAN network 716 with the ePDG 718. With the help of the ePDG 718 and the WLAN network 716, the UE 702 can communicate with the UE 703 via both the WLAN network 716 and the PDN gateway 708-2 of the mobile network 792 corresponding to SIM2 702-2. More specifically, the signaling path is from the UE 702 through WLAN network 716, the ePDG 718, the PDN gateway 708-2, the IMS service 714-2, the IMS services 714-3, eventually to the UE 703, and vice versa. The data traffic path is from the UE 702 through WLAN network 716, the ePDG 718, the PDN gateway 708-2, the PDN 720, eventually to the UE 703, and vice versa. As such, a call with the UE 702 through the mobile network 791 or the mobile network 792 can be offloaded to an IMS call through the WLAN network 716.

Figure 8:
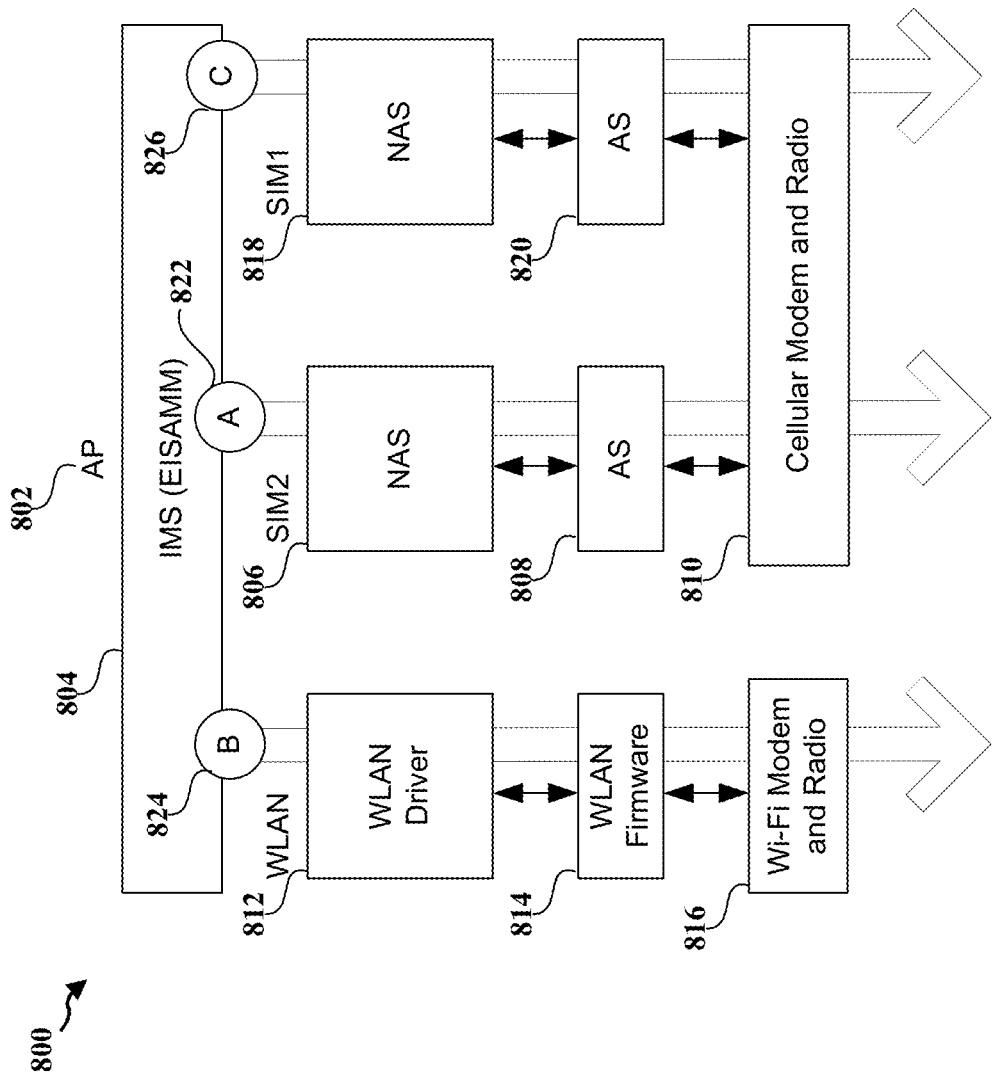
FIG. 8 is a diagram showing an example of an enhanced IMS service availability maintenance mechanism (EISAMM).

FIG. 8 is a diagram 800 showing an example of an enhanced IMS service availability maintenance mechanism (EISAMM). An application layer 802 employs EISAMM 804 to make IMS calls. The UE 702 may use three RATs: a RAT-1 826, a RAT-2 822, and a RAT-3 824. Under the subscriber identity of SIM2 702-2, the UE 702 can access the mobile network 792 using the RAT-2 822, and therefore be connected to the IMS service 714-2 or the PDN 720. More specifically, EISAMM 804 may establish an IMS call through a non access stratum (NAS) layer 806, an access stratum (AS) layer 808, and cellular modem and radio 810 of the UE 702 that can access the mobile network 792. The NAS layer 806 is a functional layer in wireless telecom protocol stacks between the core network (including, among other things, a serving gateway 706-2, a PDN gateway 708-2, a MME 710-2 and a PCRF 712-2) and the UE 702. The AS 808 is a functional layer in a wireless telecom protocol stacks between radio network (including, among other things, a base station 704-2) and the UE 702. The cellular modem and radio 810 is a module includes, among other things, modem, radio frequency components such as antennas, power amplifiers. While the RAT-1 826 is owned by the mobile network 791 and the RAT-2 822 is owned by the mobile network 792, RAT-1 and RAT-2 can be the same "Radio access technology" (e.g., E-UTRA, UTRA, NR . . . etc).

Under the subscriber identity of SIM1 702-1, the UE 702 can also access the mobile network 791 using the RAT-1 826, and therefore be connected to the IMS service 714-1 or the PDN 720. More specifically, EISAMM 804 may establish an IMS call through a non access stratum (NAS) layer 818, an access stratum (AS) layer 820, and the cellular modem and radio 810 of the UE 702 that can access the mobile network 791. The NAS layer 818 is a functional layer in wireless telecom protocol stacks between the core network (including, among other things, a serving gateway 706-1, a PDN gateway 708-1, a MME 710-1 and a PCRF 712-1) and the UE 702. The AS 820 is a functional layer in a wireless telecom protocol stacks between radio network (including, among other things, a base station 704-1) and the UE 702. The cellular modem and radio 810 is a module including, among other things, modem, radio frequency components such as antennas, power amplifiers.

Moreover, in this example, under the subscriber identity of SIM2 702-2, the UE 702 can access the mobile network 792 through the WLAN network 716 using the RAT-3 824, and therefore be connected to the IMS service 714-2 or the PDN 720. More specifically, EISAMM 804 may establish an IMS call through a WLAN driver 812, a WLAN firmware 814, and a Wi-Fi modem and radio 816 of the UE 702 that can access the WLAN network 716. The Wi-Fi modem and radio 816 is a module including, among other things, modem, radio frequency components such as antennas, power amplifiers. Therefore, EISAMM 804 can select a feasible RAT to establish an IMS call on the UE 702.

Figure 9:
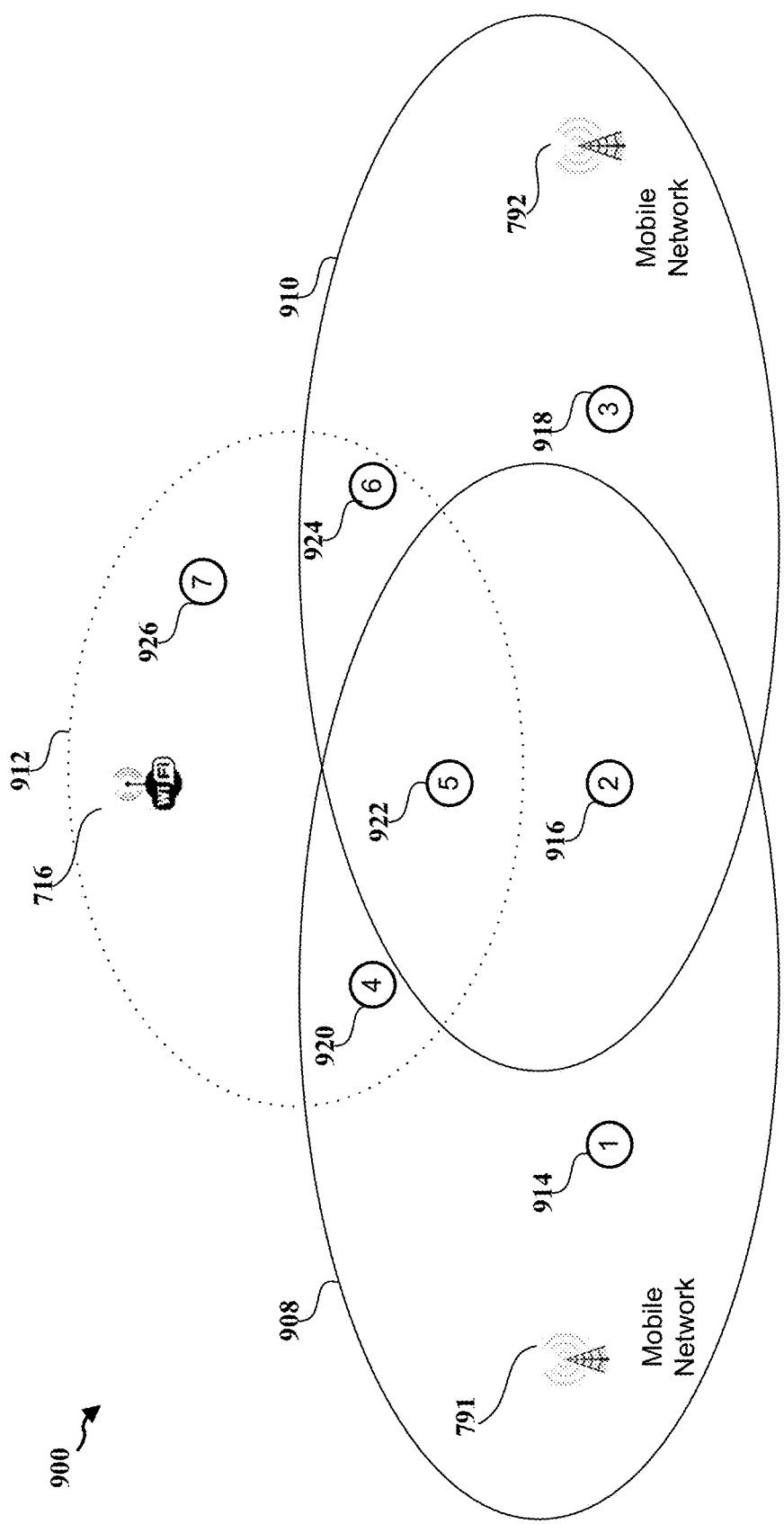
FIG. 9 is a diagram illustrating techniques of EISAMM and intelligent traffic steering mechanism (ITSM).

FIG. 9 is a diagram 900 illustrating techniques of an enhanced IMS service availability maintenance mechanism (EISAMM) and intelligent traffic steering mechanism (ITSM). One or more UEs may be connected to one or more of the mobile network 791, the mobile network 792, and the WLAN network 716. Further, the mobile network 791 has a coverage 908, the mobile network 792 has a coverage 910, and the WLAN network 716 has a coverage 912. Depending on the coverage of these three networks, the area can be divided into seven sub-areas. In other words, there are seven scenarios depending on the location of UE 702.

In the first scenario 914, a UE (e.g., the UE 702) is only within the coverage 908 of the mobile network 791. Similarly, in the third scenario 918, a UE is only within the coverage 910 of the mobile network 792. In the second scenario 916, a UE is within the coverage 908 and 910 of both the mobile network 791 and the mobile network 792. In each of the three scenarios, i.e., the first scenario 914, the second scenario 916, the third scenario 918, only mobile network(s) (e.g., the mobile network 791 and/or the mobile network 792) is/are available to a UE, and the WLAN network 716 is not available. Therefore, the UE can only connect to the IMS service 714-1 and/or 714-2 via mobile networks.

In the fourth scenario 920, a UE is within the coverage 908 of the mobile network 791 and the coverage 912 of the WLAN network 716. Similarly, in the sixth scenario, a UE is within the coverage 910 of the mobile network 792 and the coverage 912 of the WLAN network 716. While in the fifth scenario 922, a UE is within the coverage 908 of the mobile network 791, the coverage 910 of the mobile network 792, and the coverage 912 of the WLAN network 716. In each of the three scenarios, i.e., the fourth scenario 920, the fifth scenario 922, and the sixth scenario 924, at least one mobile network 791 and/or 792 as well as a WLAN network 716 are available. Therefore, a UE can connect to the IMS service 714-1 and/or 714-2 via either the mobile network(s) 791 and/or 792 or the WLAN network 716.

Finally, in the seventh scenario 926, a UE is only within the coverage 912 of the WLAN network 716. In other words, no cellular network (e.g., the mobile network 791 and/or the mobile network 792) is available to the UE. Therefore, a UE may only connect to the IMS service 714-1 and/or 714-2 via the WLAN network 716.

EISAMM is a mechanism that can select an appropriate RAT for accessing a particular network for establish or maintain an IMS. In each of the seven scenarios of this example, EISAMM may select an appropriate RAT to access the mobile network 791, the mobile network 792, and the WLAN network 716.

On the other hand, ITSM may enhance active call performance by handover. For example, in the second scenario 916, where the UE 702 is within both the coverage 908 of the mobile network 791 and the coverage 910 of the mobile network 792, ITSM can transfer connection to an IMS service (e.g., the IMS service 714-1) from one RAT to another. More specifically, under the subscriber identity of SIM2 702-2, ITSM can transfer connection to the IMS service from via the mobile network 792 to via the mobile network 791. In another example, in the fifth scenario 922, the UE 702 is within the coverage 908, 910, and 912. Therefore, under the subscriber identity of SIM2 702-2, ITSM can transfer connection to the IMS service 714-2 from via the mobile network 792 to via the mobile network 791 or via the WLAN network 716. The choice of IMS service connection depends on a selection schemes which will be detailed below.

Figure 10:
FIG. 10 is a diagram an example of EISAMM and ITSM.

FIG. 10 is a diagram 1000 illustrating an example of EISAMM and ITSM. "A" means Option A, where a SIM is used to access the own network of the SIM. "C" means Option C, where a SIM is used to access a peer network of the SIM. "B" means Option B, where a SIM is used to access a network through a WLAN.

In the first scenario 914, a UE (e.g., the UE 702) is only within the coverage 908 of the mobile network 791. Therefore, SIM1 702-1 is used in Option A and SIM2 702-2 is used in Option C. In other words, SIM1 702-1 is used to access its own network (the mobile network 791). SIM2 is used to access a peer network (the mobile network 791) of SIM2.

Similarly, in the third scenario 918, a UE is only within the coverage 910 of the mobile network 792. Therefore, SIM1 702-1 is used in Option C and SIM2 702-2 is used in Option A. In other words, SIM1 702-1 is used to access a peer network (the mobile network 792), while SIM2 702-2 is used to access its own network (the mobile network 792).

In the second scenario 916, a UE is within the coverage 908 and 910. Therefore, SIM1 702-1 is used in Option A and Option C, and SIM2 702-2 is used in Option A and Option C as well. In other words, both SIM1 702-1 and SIM2 702-2 can be used to access their respective own networks or peer networks. If SIM1 702-1 is used to have a voice call, EISAMM 804 will select Option A for SIM1 702-1 since using its own network (the mobile network 791) can provide a better voice call performance. Accordingly, SIM2 702-2 will end up using Option C. In other words, SIM2 702-2 is used to access a peer network (the mobile network 791). In other words, SIM1 702-1 and SIM2 702-2 are both used to access the mobile network 791.

In the fourth scenario 920, a UE is within the coverage 908 and 912. Therefore, SIM1 702-1 is used in Option A and Option B, while SIM2 702-2 is used in Option B and Option C. In other words, SIM1 702-1 can be uses to access either its own network or a WLAN network, while SIM2 can be used to access either a peer network or a WLAN network. If SIM1 702-1 is used to have a voice call, EISAMM 804 will select Option A for SIM1 702-1 since using own network (the mobile network 791) can provide a better voice call performance. Accordingly, SIM2 702-2 is used in either Option B or Option C. In other words, SIM2 702-2 is used to access either the WLAN network 716 or a peer network (the mobile network 791). In other words, SIM1 702-1 and SIM2 702-2 are both used to access the mobile network 791. Since there are two options for SIM2 702-2, ITSM can be employed to enhance active call performance by handover.

Similarly, in the sixth scenario 924, a UE is within the coverage 910 and 912. Therefore, SIM1 702-1 is used in Option C and Option B, while SIM2 702-2 is used in Option A and Option B. In other words, SIM1 702-1 can be used to access either a peer network or a WLAN network, while SIM2 702-2 can be uses to access either its own network or a WLAN network. If SIM1 702-1 is used to have a voice call, EISAMM 804 will select either Option B or Option C for SIM1 702-1 since using its own network is not available here. Accordingly, SIM2 702-2 is used in either Option A or Option B. In other words, SIM2 702-2 is used to access either the WLAN network 716 or its own network (i.e., the mobile network 792). Since there are two options for both SIM1 702-1 and SIM2 702-2, ITSM can be employed to enhance active call performance by handover.

In the fifth scenario 922, a UE is within the coverage 908, 910, and 912. Therefore, both SIM1 702-1 and SIM2 702-2 have Option A, Option B, and Option C. In other words, both SIM1 702-1 and SIM2 702-2 can be uses to access their respective own networks, peer networks, or a WLAN network. If SIM1 702-1 is used to have a voice call, EISAMM 804 will select Option A for SIM1 702-1 since using own network can provide a better voice call performance. Accordingly, SIM2 702-2 is used in either Option B or Option C. In other words, SIM2 is used to access either the WLAN network 716 or a peer network (i.e., the mobile network 791). In other words, SIM1 702-1 and SIM2 702-2 can both be uses to access the mobile network 791. Since there are two options for SIM2 702-2, ITSM can be employed to enhance active call performance by handover.

In the seventh scenario 926, a UE is within the coverage 912. Therefore, both SIM1 702-1 and SIM2 702-2 are used in Option B. In other words, both SIM1 702-1 and SIM2 702-2 can be used to access their networks via the WLAN network 716.

Figure 11:
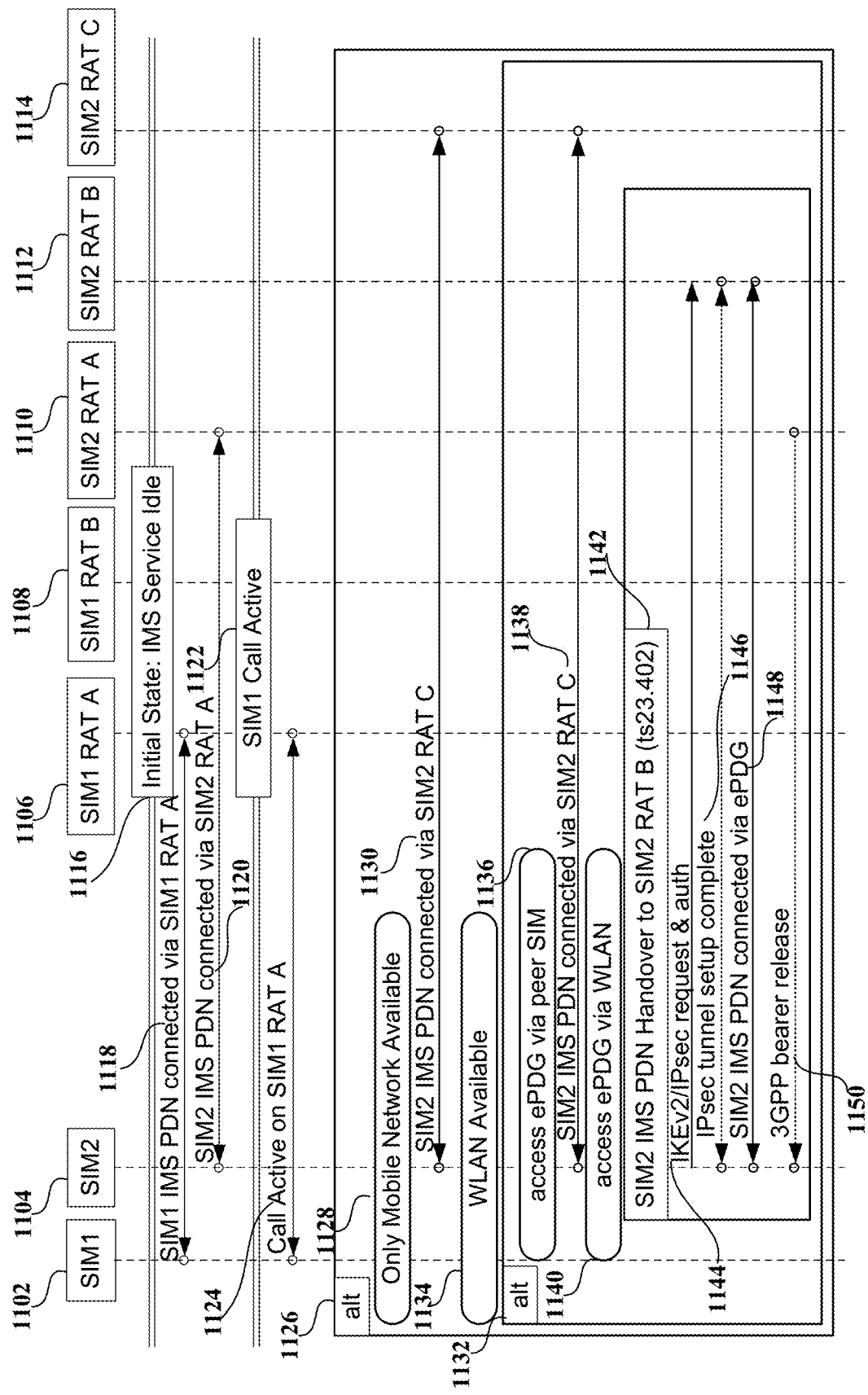
FIG. 11 is a diagram illustrating techniques of wireless communication of the UE.

FIG. 11 is a diagram 1100 illustrating techniques of wireless communication of the UE 702. SIM1 1102 has two available RATs: SIM1 RAT-OPT-A 1106 and SIM1 RAT-OPT-B 1108, where SIM1 RAT-OPT-A 1106 refers to a RAT accessing the SIM's own network, i.e., the mobile network 791; and SIM1 RAT-OPT-B 1108 refers to a RAT accessing the WLAN network 716. SIM2 1104 has three available RATs: SIM2 RAT-OPT-A 1110, SIM2 RAT-OPT-B 1112, and SIM2 RAT-OPT-C 1114, where SIM2 RAT-OPT-A 1110 refers to a RAT of the SIM's own network, i.e., the mobile network 792; SIM2 RAT-OPT-B 1111 refers to a RAT accessing the WLAN network 716; and SIM2 RAT-OPT-C 1114 refers to a RAT accessing a peer network of the SIM, i.e., the mobile network 791.

At beginning 1116, the initial state is that IMS service is idle. More specifically, at 1118, SIM1 1102 is connected via SIM1 RAT-OPT-A 1106, while at 1120, SIM2 1104 is connected via SIM2 RAT-OPT-A 1110. In other words, both SIM1 1102 and SIM2 1104 are using its own network in initial state 1116 where IMS service is idle.

Then SIM1 1102 becomes call active at 1122. Since using its own network can provide a better voice call performance than using the WLAN network 716, EISAMM will select SIM1 RAT-OPT-A 1106 to establish a call, at 1124. As to SIM2 1104, there are two alternatives: alternative one 1126 and alternative two 1132.

In alternative one 1126, only mobile network is available, at 1128. In other words, SIM2 RAT-OPT-A 1110 and SIM2 RAT-OPT-C 1114 are available, and SIM2 RAT-OPT-B 1112 is not available. In this situation, SIM2 1104 is connected via SIM2 RAT-OPT-C 1114. In other words, SIM2 1104 is using peer network, i.e., the mobile network 791.

In alternative two 1132, both mobile network and the WLAN network 716 are available, at 1134. SIM2 1104 may access ePDG 718 via peer network (the mobile network 791) via the, at 1136. In this case, SIM2 1104 is connected via SIM2 RAT-OPT-C 1114, at 1138.

SIM2 1104 may also access ePDG 718 via the WLAN network 716, at 1140. More specifically, at 1142, SIM2 1104 connection is handed over to SIM2 RAT-OPT-B 1112. More specifically, at 1144, devices first authenticate each other and establish a security association using a protocol called Internet Key Exchange version 2 (IKEv2), and encryption and integrity protection are then implemented using the Internet Protocol Security (IPSec) Encapsulating Security Payload. At 1146, IPsec tunnel setup is completed. At 1148, SIM2 1104 is connected via ePDG 718. Then, at 1150, a 3GPP bearer is released. In summary, the UE 702 can hand over connection of the SIM2 1104 to the WLAN network 716 by following 3GPP TS 23.402 flow.

IMS service may have different characteristics under different conditions. For example, IMS service connected via a SIM's own mobile network, corresponding to Option A, has the characteristic of stable wireless resource with quality of service (QoS) guarantee. IMS service connected via a peer mobile network of the SIM, corresponding to Option C, has the characteristic of stable wireless resource but without QoS guarantee. IMS service connected via the WLAN network 716, corresponding to Option B, has the characteristics of less power consumption and less cost from unlicensed band (2.4 GHz/5 GHz), contention-based wireless resource, and without QoS guarantee.

For a dual SIM dual standby (DSDS) UE under the second scenario 916, the fourth scenario 920, the fifth scenario 922, and the sixth scenario 924, as mentioned above and illustrated in FIG. 9, ITSM selects a proper RAT, based on at least one of the following group of requirements: call quality, a cost to make the first call, a power consumption of the UE 702, and a handover rate. More specifically, in a performance centric situation, best voice/video quality is desired, and generally IMS service (e.g., the IMS service 714-1 or 714-2) with active call generally should stay on the mobile network. In a cost centric situation, reducing data plan cost for the voice/video call is desired, and generally IMS service (e.g., the IMS service 714-1 or 714-2) with active call should stay on the WLAN network 716. In a power centric situation, reducing power consumption of the UE 702 is desired. In a mobility centric situation, reducing handover occurring rate is desired. In a hybrid situation, ITSM can combine all the requirements or performance indicator mentioned above with different weights to select a preferred RAT. The allocation of weights are flexible as needed. It should be noted other requirements or performance indicators can be employed based on consumer need.

Figure 12:
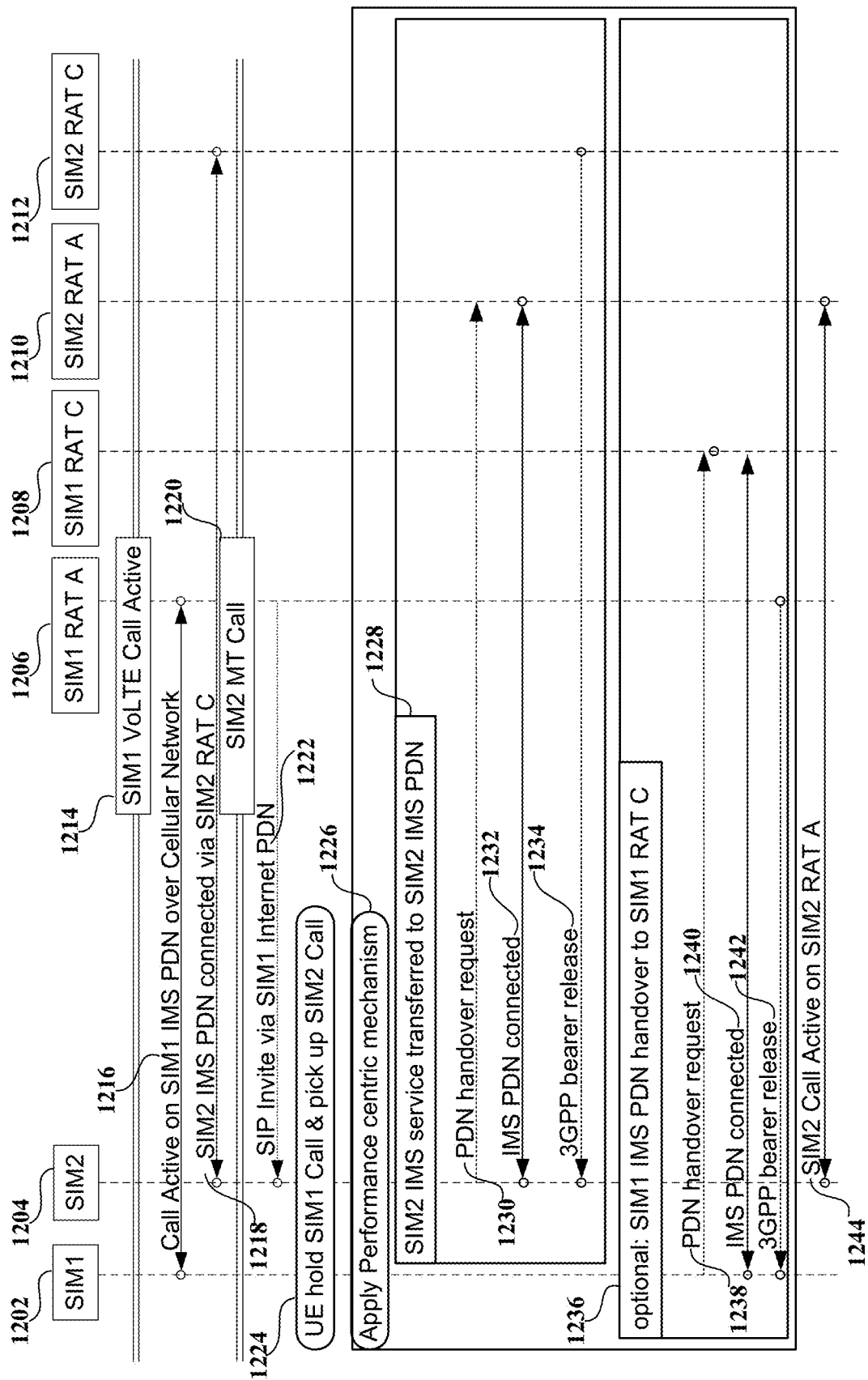
FIG. 12 is another diagram illustrating techniques of wireless communication of the UE.

FIG. 12 is a diagram 1200 illustrating techniques of wireless communication of the UE 702. SIM1 1202 has two available RATs: SIM1 RAT-OPT-A 1206 and SIM1 RAT-OPT-C 1208, where SIM1 702-1 RAT-OPT-A 1206 refers to a RAT accessing the SIM's own network, i.e., the mobile network 791; and SIM1 702-1 RAT-OPT-C 1208 refers to a RAT accessing a peer network of the SIM, i.e., the mobile network 792. SIM2 1204 has two available RATs: SIM2 RAT-OPT-A 1210 and SIM2 RAT-OPT-C 1212, where SIM2 RAT-OPT-A 1210 refers to a RAT accessing the SIM's own network, i.e., the mobile network 792; SIM2 RAT-OPT-C 1212 refers to a RAT accessing a peer network of the SIM, i.e., the mobile network 791.

At beginning 1214, a SIM1 voice-over-LTE (VoLTE) call is active. More specifically, at 1216, a call is active on SIM1 via the mobile network 791, while at 1218, SIM2 is connected via SIM2 RAT-OPT-C 1212. In other words, both SIM1 1202 and SIM2 1204 are using the mobile network 791 in initial state 1214 where SIM1 VoLTE call is active.

Then SIM2 mobile terminating (MT) call occurs at 1220. More specifically, at 1222, a SIP invite is sent via SIM1 702-1 internet PDN.

Then at 1224, the UE 702 can hold SIM1 call and pick up SIM2 call, so that SIM2 call can become an active call. More specifically, a performance centric mechanism is applied at 1226, and SIM2 call becomes active via SIM2 RAT-OPT-A 1210, at 1244. In other words, SIM2 call is via the mobile network 792. It should be noted that the sequences between 1226 and 1244 can be changed. In other words, SIM2 call can become active via SIM2 RAT-OPT-A 1210 first at 1244, then a performance centric mechanism is applied at 1226.

More specifically, applying performance centric mechanism 1226 includes that SIM2 IMS service is transferred to the IMS service 714-2, at 1228. In other words, SIM2 call is using its own network, i.e., the mobile network 792, and therefore, a better voice/video quality can be achieved. More specifically, at 1230, a PDN handover request is sent to the mobile network 792. Since SIM1 call is held, the UE 702 can reserve enough radio resource to serve SIM2 PDN handover request over the mobile network 792. Then, at 1232, SIM2 1204 is connected to the IMS service 714-2. Then, at 1234, a 3GPP bearer is released.

Optionally, connection of SIM1 1202 is handed over to SIM1 RAT-OPT-C 1208. In other words, SIM1 702-1 is using peer network, i.e., the mobile network 792. More specifically, at 1238, a PDN handover request is sent to the mobile network 792. Then, at 1240, SIM1 1202 is connected to the IMS service 714-2. Then, at 1242, a 3GPP bearer is released.

Figure 13:
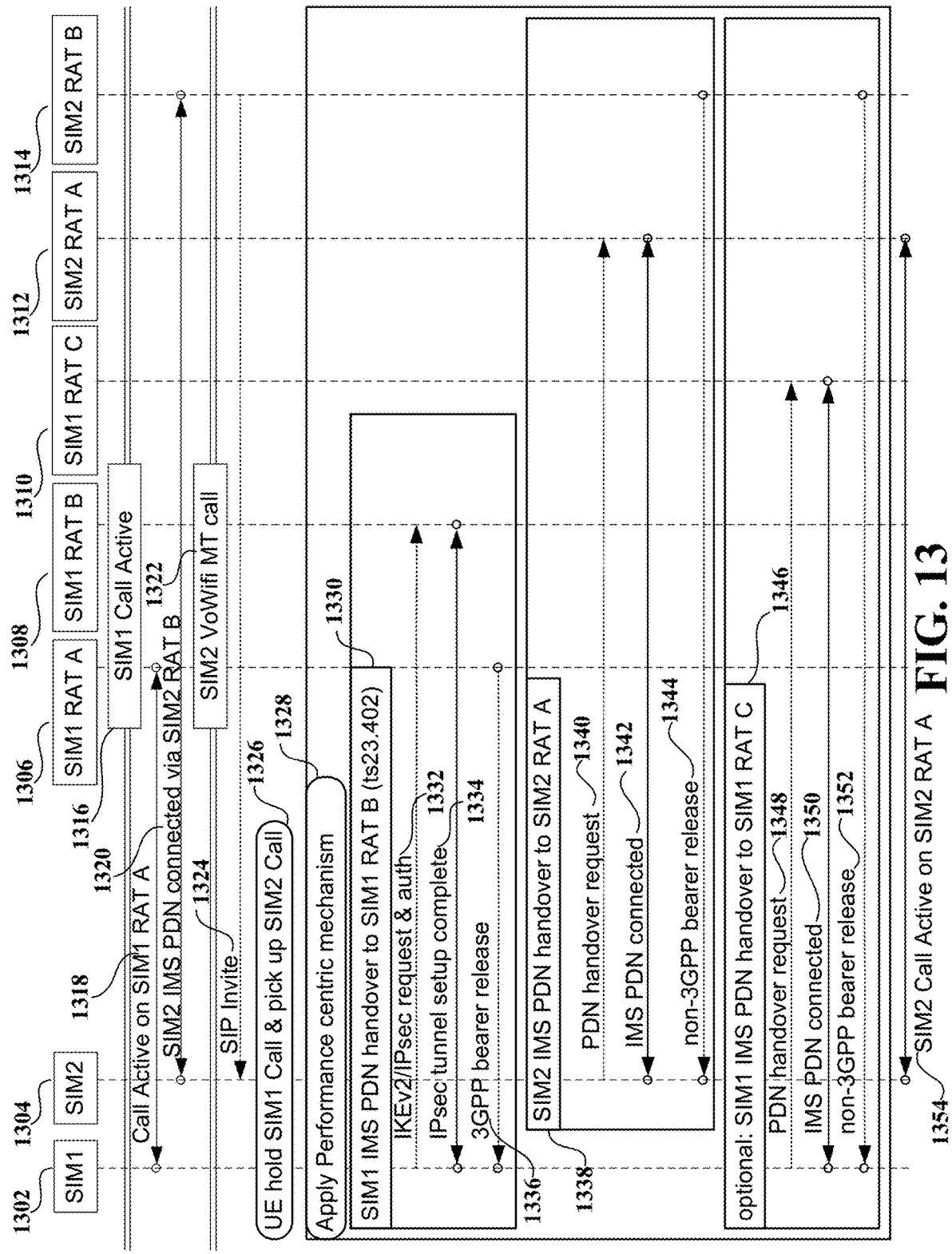
FIG. 13 is yet another diagram illustrating techniques of wireless communication of the UE.

FIG. 13 is a diagram 1300 illustrating techniques of wireless communication of the UE 702. SIM1 1302 has three available RATs: SIM1 RAT-OPT-A 1306, SIM1 RAT-OPT-B 1308, and SIM1 RAT-OPT-C 1310, where SIM1 RAT-OPT-A 1306 refers to a RAT accessing the SIM's own network, i.e., the mobile network 791; SIM1 RAT-OPT-B 1308 refers to a RAT accessing the WLAN network 716; and SIM1 RAT-OPT-C 1310 refers to a RAT accessing a peer network of the SIM, i.e., the mobile network 792. SIM2 1304 has two available RATs: SIM2 RAT-OPT-A 1312, and SIM2 RAT-OPT-B 1314, where SIM2 RAT-OPT-A 1312 refers to a RAT accessing the SIM's own network, i.e., the mobile network 792; and SIM2 RAT-OPT-B 1314 refers to a RAT accessing the WLAN network 716.

At beginning 1316, a SIM1 call is active. More specifically, at 1318, SIM1 call is active on SIM1 RAT-OPT-A 1306, while at 1320, SIM2 is connected via SIM2 RAT-OPT-B 1313. In other words, SIM1 1302 is using own network (the mobile network 791) while SIM2 1304 is using the WLAN network 716.

Then SIM2 voice-over-WiFi (VoWifi) mobile terminating call occurs at 1322. More specifically, at 1324, a SIP invite is sent.

Then at 1326, UE can hold SIM1 call and pick up SIM2 call, so that SIM2 call can become an active call. More specifically, a performance centric mechanism is applied at 1328, and SIM2 call becomes active on SIM2 RAT-OPT-A 1312, at 1354. It should be noted that the sequences between 1328 and 1354 can be changed. In other words, SIM2 call can become active on SIM2 RAT-OPT-A 1312 first at 1354, then a performance centric mechanism is applied at 1328.

More specifically, applying performance centric mechanism 1328 includes that connection of SIM1 1302 is handed over to SIM1 RAT-OPT-B 1308 at 1330. In other words, SIM1 call is using the WLAN network 716, and therefore, mobile network resource is released. More specifically, at 1332, devices first authenticate each other and establish a security association using a protocol called Internet Key Exchange version 2 (IKEv2), and encryption and integrity protection are then implemented using the Internet Protocol Security (IPSec) Encapsulating Security Payload. At 1334, IPsec tunnel setup is completed. Then, at 1336, a 3GPP bearer is released.

To keep active call performance, SIM2 call need to be transferred to mobile network, i.e., the mobile network 792. Thus, at 1338, connection of SIM2 1304 is handed over to SIM2 RAT-OPT-A 1312. More specifically, at 1340, a PDN handover request is sent. Then, SIM2 1304 is connected to the IMS service 714-2 at 1342. Then, a non-3GPP bearer is released at 1344.

Optionally, connection of SIM1 1302 is handed over to SIM1 RAT-OPT-C 1310. In other words, SIM1 1302 is using peer network, i.e., the mobile network 792. More specifically, at 1348, a PDN handover request is sent to the mobile network 792. Then, at 1350, SIM1 1302 is connected to the IMS service 714-2. Then, at 1352, a non-3GPP bearer is released.

Figure 14:
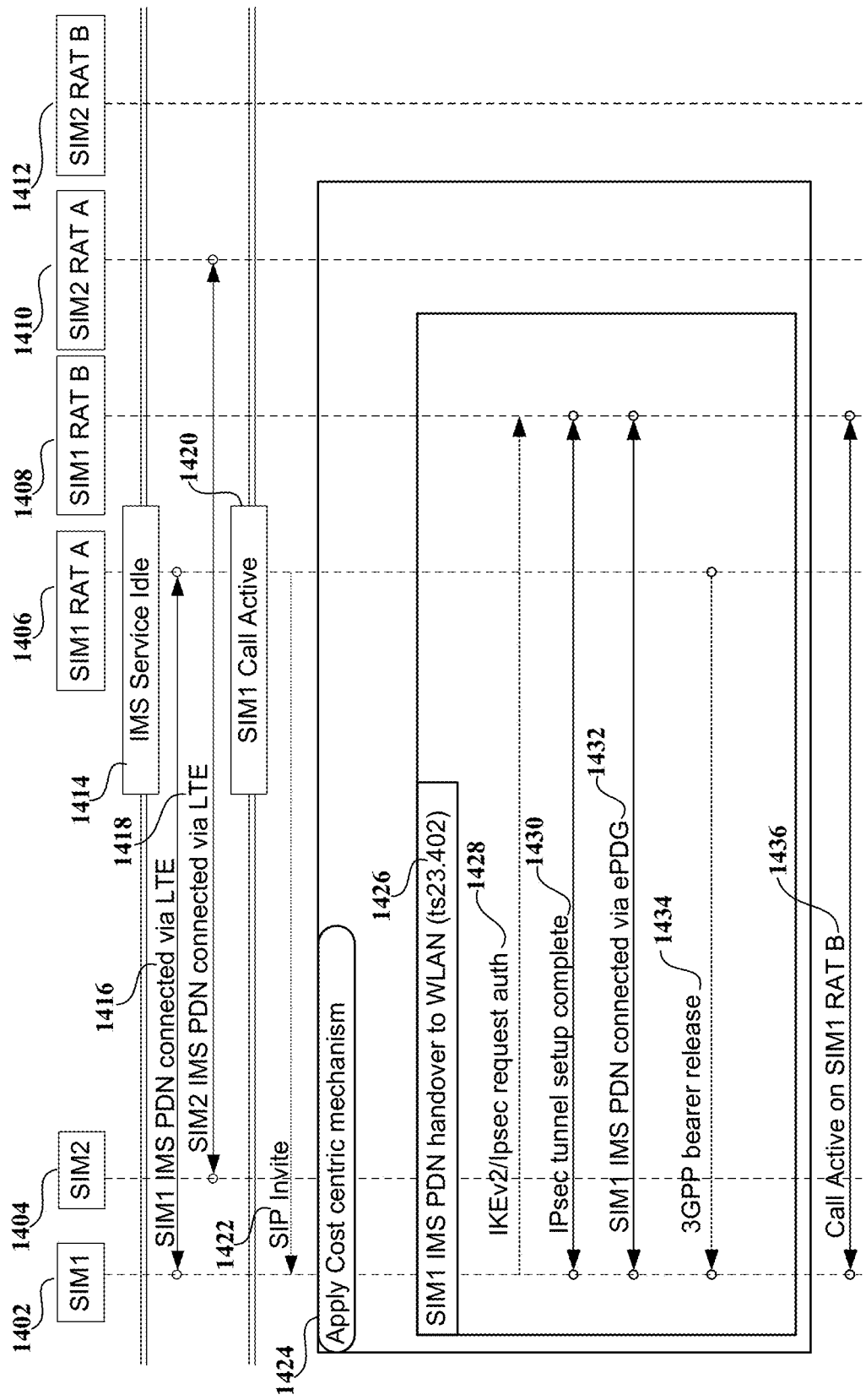
FIG. 14 is also a diagram illustrating techniques of wireless communication of the UE.

FIG. 14 is a diagram 1400 illustrating techniques of wireless communication of the UE 702. SIM1 1402 has two available RATs: SIM1 RAT-OPT-A 1406 and SIM1 RAT-OPT-B 1408, where SIM1 RAT-OPT-A 1406 refers to a RAT accessing the SIM's own network, i.e., the mobile network 791; and SIM1 RAT-OPT-B 1408 refers to a RAT accessing the WLAN network 716. SIM2 1404 has two available RATs: SIM2 RAT-OPT-A 1410 and SIM2 RAT-OPT-B 1412, where SIM2 RAT-OPT-A 1410 refers to a RAT accessing the SIM's own network, i.e., the mobile network 792; SIM2 RAT-OPT-B 1412 refers to a RAT accessing the WLAN network 716.

At beginning 1414, the initial state is that IMS service is idle. More specifically, at 1416, SIM1 1402 is connected via SIM1 RAT-OPT-A 1406, while at 1418, SIM2 1404 is connected via SIM2 RAT-OPT-A 1410. In other words, both SIM1 1402 and SIM2 1404 are using its own network in initial state 1414 where IMS service is idle.

Then SIM1 call becomes active at 1420. More specifically, at 1422, a SIP invite is sent.

Then at 1424, a cost centric mechanism is applied. For example, in the situation of a video call, WLAN is usually preferred for cost-saving purpose. More specifically, at 1428, devices first authenticate each other and establish a security association using a protocol called Internet Key Exchange version 2 (IKEv2), and encryption and integrity protection are then implemented using the Internet Protocol Security (IPSec) Encapsulating Security Payload. At 1430, IPsec tunnel setup is completed. At 1432, SIM1 1402 is connected to the IMS service 714-1 via an ePDG (like the ePDG 718). Then, at 1434, a 3GPP bearer is released. In summary, the UE 702 can hand over SIM1 call to the WLAN network 716 according to a cost centric mechanism.

Additionally, in a hybrid RAT selection situation, each available RAT is evaluated by giving each concerned requirement or performance indicator a weight and calculate the corresponding total score of each RAT. An active call then will be transferred to the RAT with the highest total score, and that RAT is called a preferred RAT. The performance centric mechanism and the cost centric mechanism mentioned above can be regarded as typical examples of a general hybrid RAT selection situation. In other words, a general hybrid RAT selection can be flexible in selecting concerned requirement or performance indicator and allocating weights thereof as needed.

More specifically, an average of each performance indicator over time is first calculated. Then, each desired performance indicator will be assigned a number 1, and other performance indicators will be assigned a number 0. Finally, multiply the average of each performance indicator over time by the assigned number (0 or 1, representing whether a specific performance indicator is desired to be used in evaluation) as well as their weights, and add the results up. In this way, each RAT can get a weighted mean score as to both time and various performance indicators. This is an intelligent, adaptive mechanism.

Figure 15:
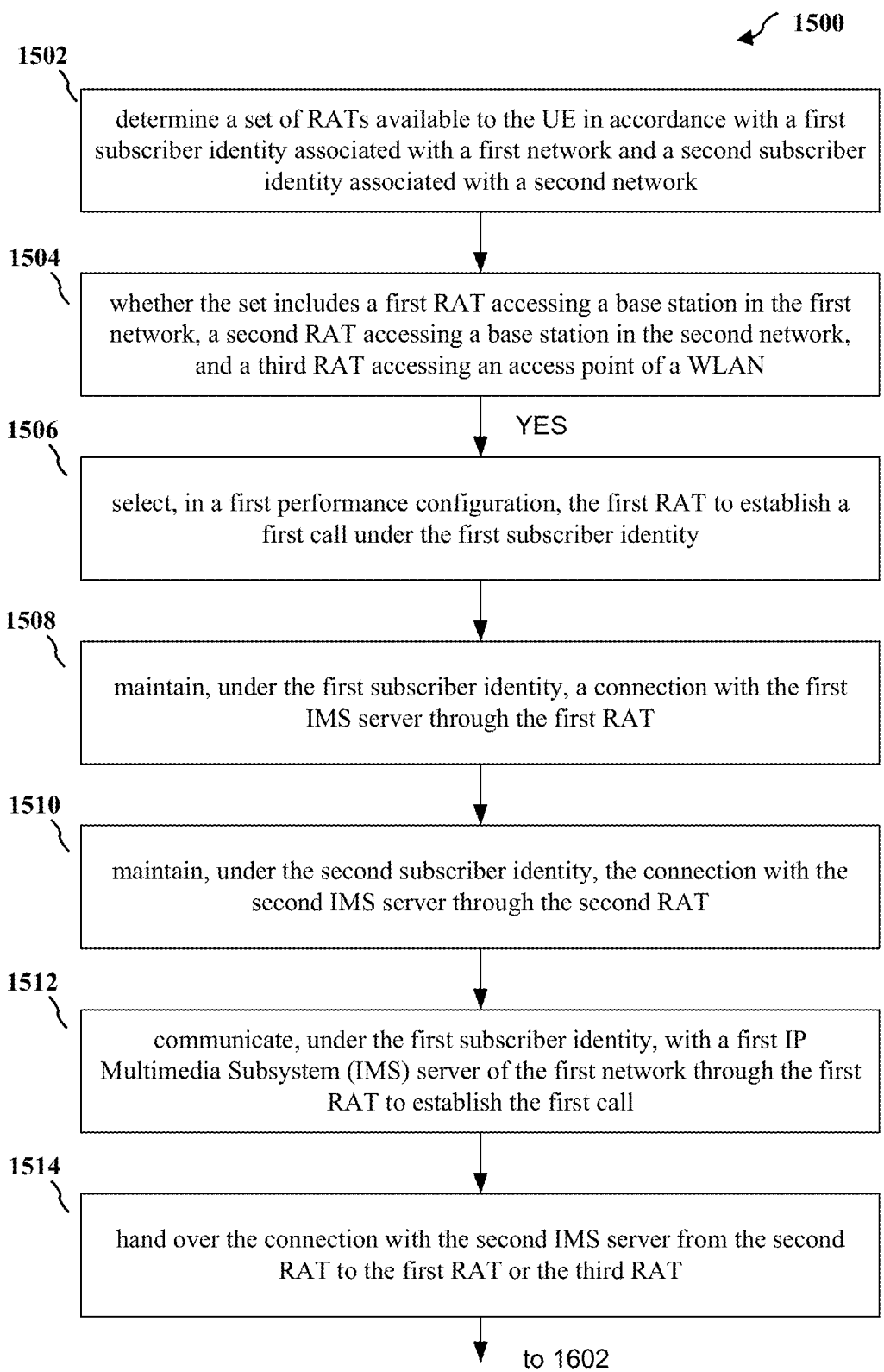
FIG. 15 is a flow chart illustrating a method (process) of wireless communication of a UE.

FIG. 15 is a flow chart 1500 illustrating a method (process) of wireless communication of a UE 702. The method may be performed by a UE (e.g., the UE 702, the apparatus 2502/2502'). At operation 1502, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 1504, the UE 702 determines whether the set includes a first RAT (e.g., the RAT-1 826) accessing a base station (e.g., the base station 704-1) in the first network, a second RAT (e.g., the RAT-2 822) accessing a base station (e.g., the base station 704-2) in the second network, and a third RAT (e.g., the RAT-3 824) accessing an access point of a WLAN (e.g., the WLAN network 716). If the set includes the first RAT accessing a base station in the first network, a second RAT accessing a base station in the second network, and a third RAT accessing an access point of a WLAN, then the method (process) proceeds to operation 1506, otherwise the method (process) ends.

At operation 1506, the UE 702 selects, in a first performance configuration, the first RAT to establish a first call under the first subscriber identity (e.g., the SIM1 702-1). In certain configurations, the first RAT is selected based on at least one of a call quality, a cost to make the first call, a power consumption of the UE, and a handover rate.

At operation 1508, the UE 702 maintains, under the first subscriber identity, a connection with the first IMS server (e.g., the IMS service 714-1) through the first RAT.

At operation 1510, the UE 702 maintains, under the second subscriber identity, the connection with the second IMS server (e.g., the IMS service 714-2) through the second RAT (e.g., the RAT-2 822).

At operation 1512, the UE 702 communicates, under the first subscriber identity, with a first IMS server (e.g., the IMS service 714-1) of the first network through the first RAT to establish the first call.

At operation 1514, the UE 702 hands over the connection with the second IMS server (e.g., the IMS service 714-2) from the second RAT to the first RAT or the third RAT.

The operation 1514 is followed by the operation 1602 in FIG. 16 below.

Figure 16:
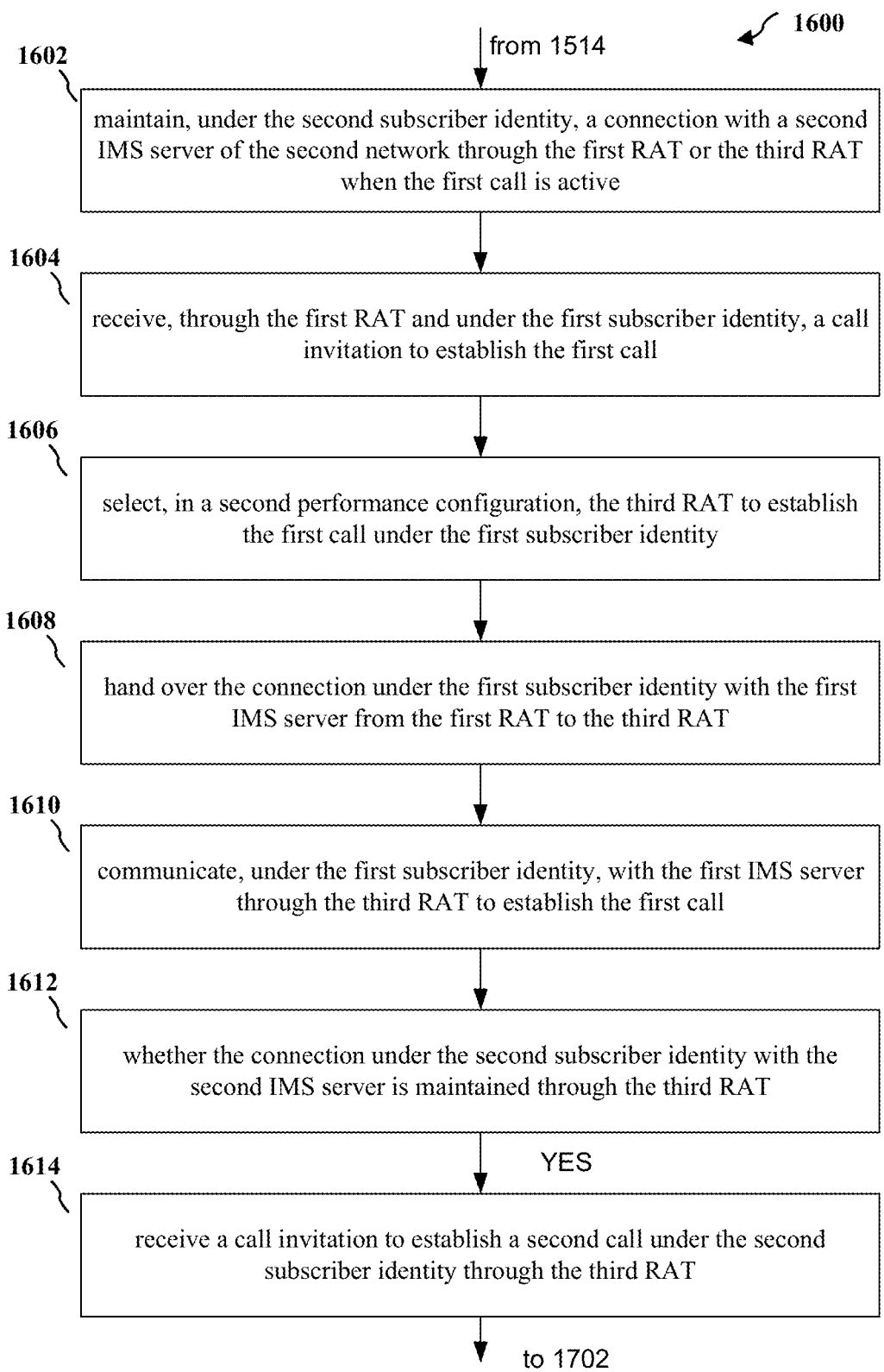
FIG. 16 is a flow chart illustrating a method (process) of wireless communication of a UE.

FIG. 16 is a flow chart 1600 illustrating a method (process) of wireless communication of a UE 702. The method may be performed by a UE (e.g., the UE 702, the apparatus 2502/2502'). At operation 1602, the UE 702 maintains, under the second subscriber identity, a connection with a second IMS server (e.g., the IMS service 714-2) of the second network through the first RAT (e.g., the RAT-1 826) or the third RAT (e.g., the RAT-3 824) when the first call is active.

At operation 1604, the UE 702 receives, through the first RAT and under the first subscriber identity, a call invitation to establish the first call.

At operation 1606, the UE 702 selects, in a second performance configuration, the third RAT to establish the first call under the first subscriber identity.

At operation 1608, the UE 702 hands over the connection under the first subscriber identity with the first IMS server from the first RAT to the third RAT (e.g., RAT-3 824).

At operation 1610, the UE 702 communicate, under the first subscriber identity, with the first IMS server through the third RAT (e.g., RAT-3 824) to establish the first call.

At operation 1612, the UE 702 determines whether the connection under the second subscriber identity with the second IMS server is maintained through the third RAT (e.g., RAT-3 824). If the connection under the second subscriber identity with the second IMS server is maintained through the third RAT (e.g., RAT-3 824), then proceed to operation 1614, otherwise the method (process) ends.

At operation 1614, the UE 702 receives a call invitation to establish a second call under the second subscriber identity through the third RAT (e.g., RAT-3 824).

The operation 1614 is followed by the operation 1702 in FIG. 17 below.

Figure 17:
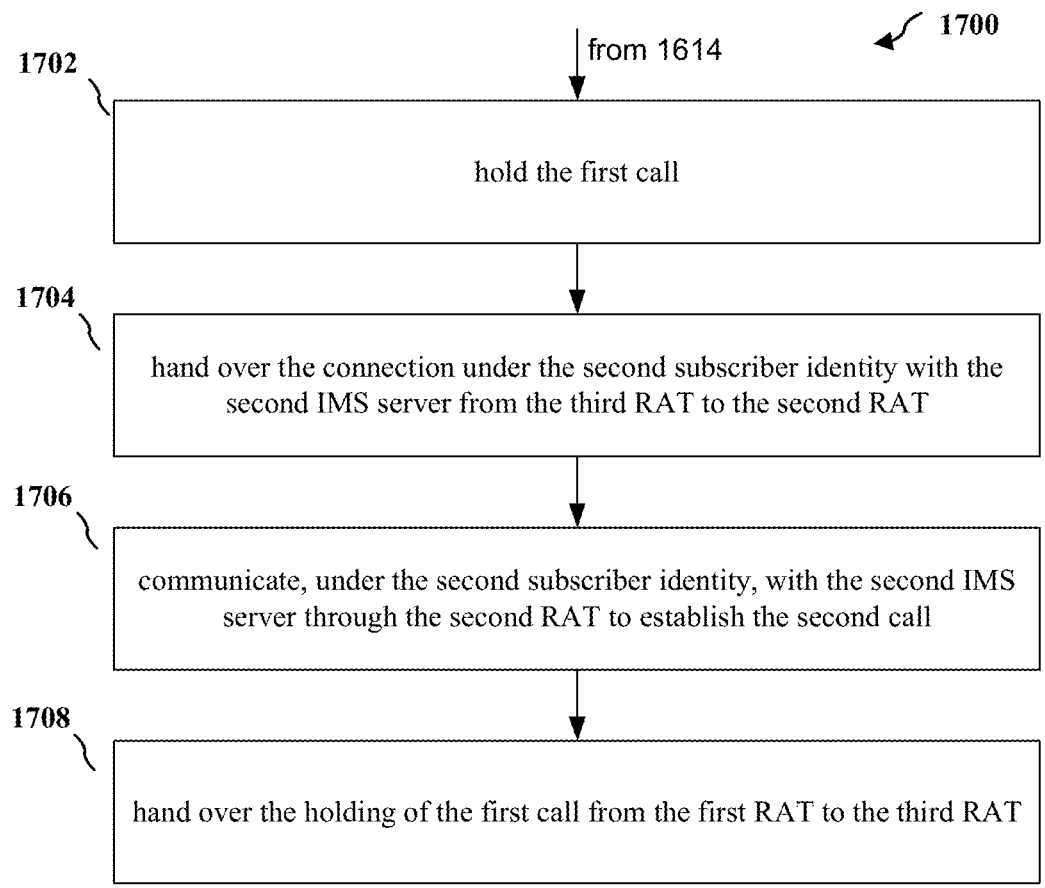
FIG. 17 is a flow chart illustrating a method (process) of wireless communication of a UE.

FIG. 17 is a flow chart 1700 illustrating a method (process) of wireless communication of a UE 702. The method may be performed by a UE (e.g., the UE 702, the apparatus 2502/2502'). At operation 1702, the UE 702 holds the first call.

At operation 1704, the UE 702 hands over the connection under the second subscriber identity with the second IMS server from the third RAT (e.g., RAT-3 824) to the second RAT (e.g., RAT-2 822).

At operation 1706, the UE 702 communicates, under the second subscriber identity, with the second IMS server through the second RAT (e.g., RAT-2 822) to establish the second call.

At operation 1708, the UE 702 hands over the holding of the first call from the first RAT to the third RAT.

Figure 18:
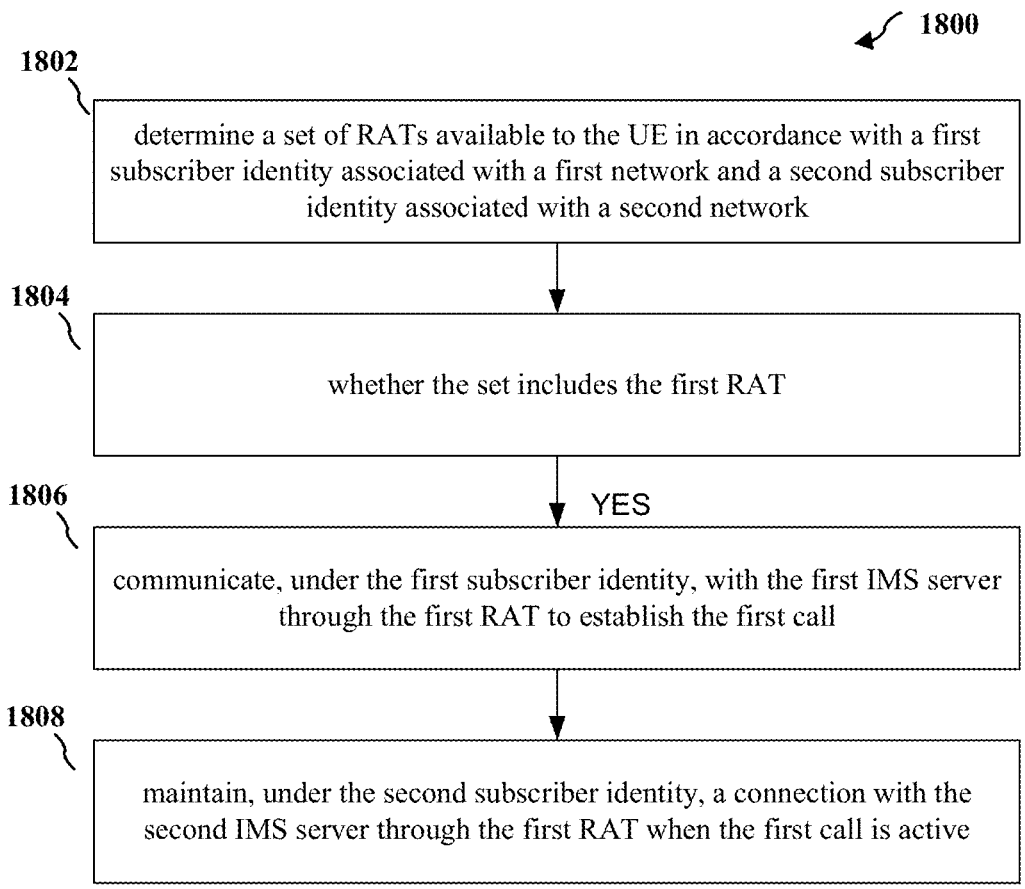
FIG. 18 is a flow chart illustrating a method (process) of wireless communication of a UE.

FIG. 18 is a flow chart 1800 illustrating a method (process) of wireless communication of a UE 702. The method may be performed by a UE (e.g., the UE 702, the apparatus 2502/2502'). At operation 1802, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 1804, the UE 702 determines whether the set includes the first RAT. If the set includes the first RAT, then the method (process) proceeds to operation 1806, otherwise the method (process) ends.

At operation 1806, the UE 702 communicates, under the first subscriber identity, with the first IMS server through the first RAT to establish the first call.

At operation 1808, the UE 702 maintains, under the second subscriber identity, a connection with the second IMS server through the first RAT (e.g., RAT-1 826) when the first call is active.

Figure 19:
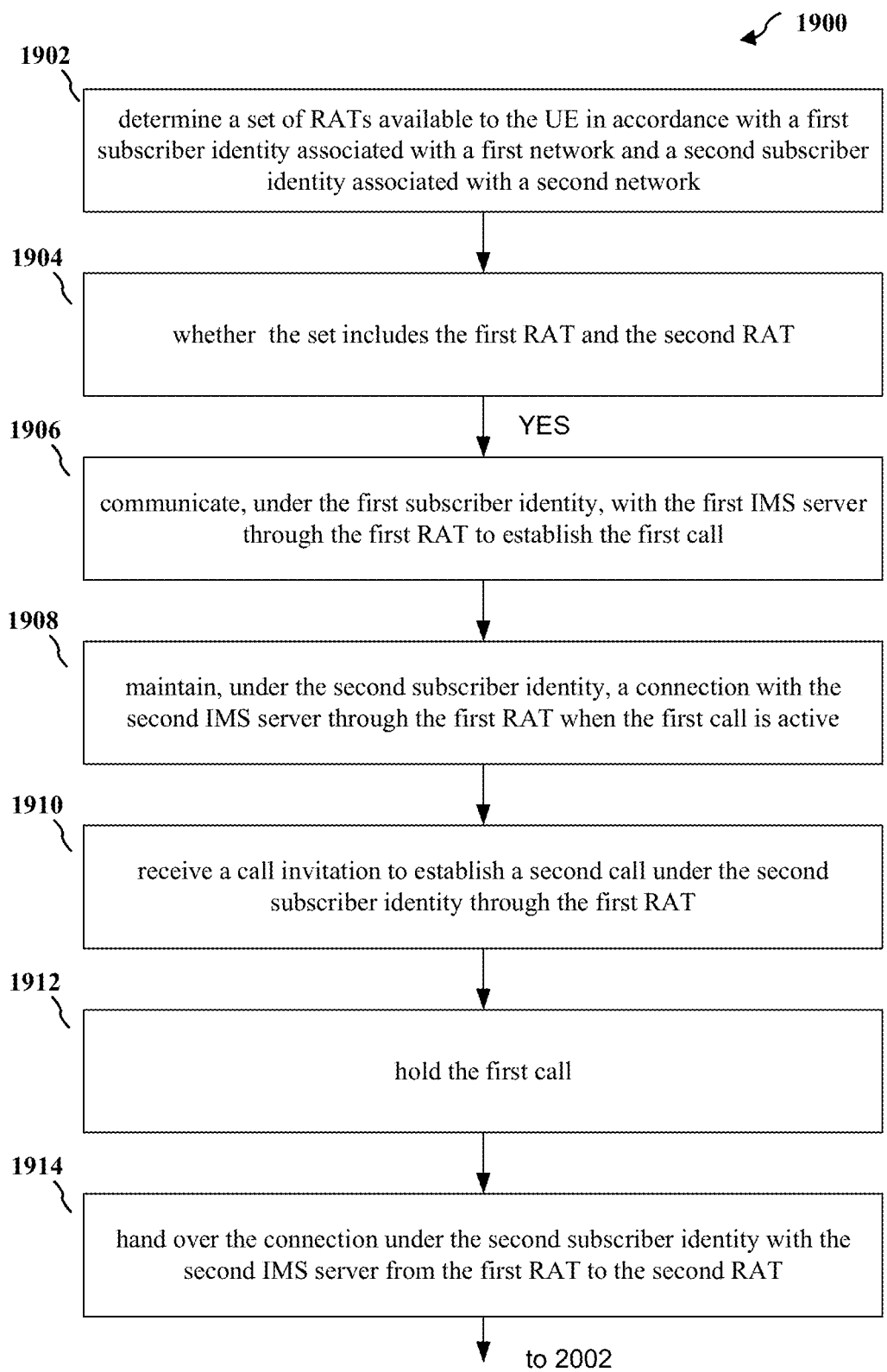
FIG. 19 is a flow chart illustrating a method (process) of wireless communication of a UE.

FIG. 19 is a flow chart 1900 illustrating a method (process) of wireless communication of a UE 702. The method may be performed by a UE (e.g., the UE 702, the apparatus 2502/2502'). At operation 1902, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 1904, the UE 702 determines whether the set includes the first RAT and the second RAT. If the set includes the first RAT and the second RAT, then the method (process) proceeds to operation 1006, otherwise the method (process) ends.

At operation 1906, the UE 702 communicates, under the first subscriber identity, with the first IMS server through the first RAT to establish the first call.

At operation 1908, the UE 702 maintains, under the second subscriber identity, a connection with the second IMS server through the first RAT (e.g., RAT-1 826) when the first call is active.

At operation 1910, the UE 702 receives a call invitation to establish a second call under the second subscriber identity through the first RAT (e.g., RAT-1 826).

At operation 1912, the UE 702 holds the first call.

At operation 1914, the UE 702 hands over the connection under the second subscriber identity with the second IMS server from the first RAT (e.g., RAT-1 826) to the second RAT (e.g., RAT-2 822).

The operation 1914 is followed by operation 2002 in FIG. 20 below.

Figure 20:
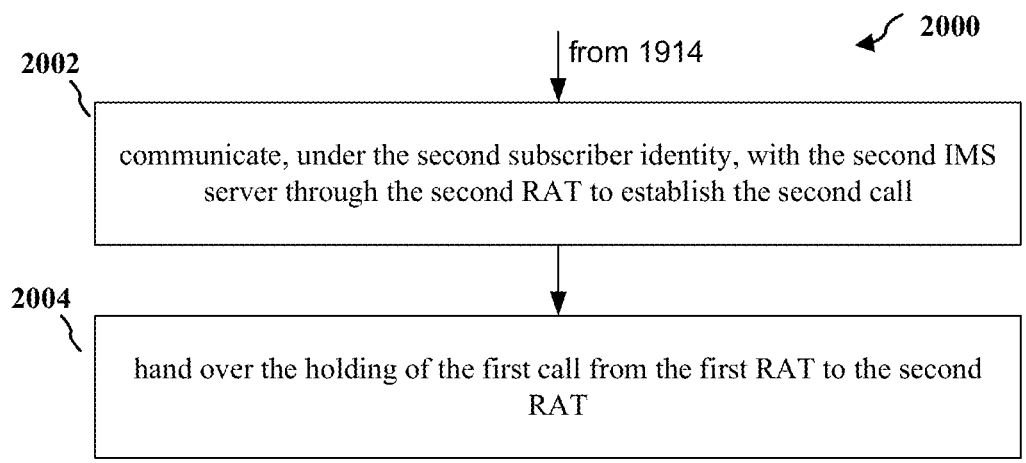
FIG. 20 is a flow chart illustrating a method (process) of wireless communication of a UE.

FIG. 20 is a flow chart 1900 illustrating a method (process) of wireless communication of a UE 702. The method may be performed by a UE (e.g., the UE 702, the apparatus 2502/2502'). At operation 2002, the UE 702 communicates, under the second subscriber identity, with the second IMS server through the second RAT to establish the second call.

At operation 2004, the UE 702 hands over the holding of the first call from the first RAT to the second RAT.

Figure 21:
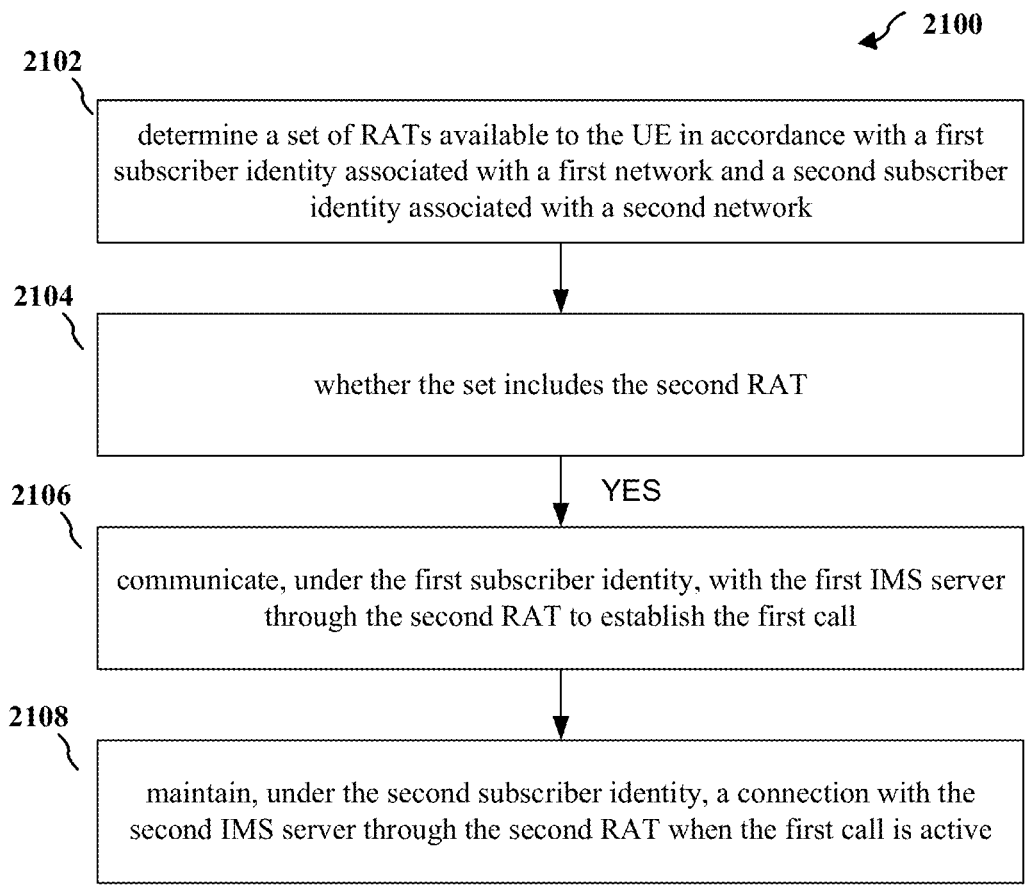
FIG. 21 is a flow chart illustrating a method (process) of wireless communication of a UE.

FIG. 21 is a flow chart 1800 illustrating a method (process) of wireless communication of a UE 702. The method may be performed by a UE (e.g., the UE 702, the apparatus 2502/2502'). At operation 2102, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 2104, the UE 702 determines whether the set includes the second RAT.

If the set includes the second RAT, then the method (process) proceeds to operation 2106, otherwise the method (process) ends.

At operation 2106, the UE 702 communicates, under the first subscriber identity, with the first IMS server through the second RAT to establish the first call.

At operation 2108, the UE 702 maintains, under the second subscriber identity, a connection with the second IMS server through the second RAT (e.g., RAT-2 822) when the first call is active.

Figure 22:
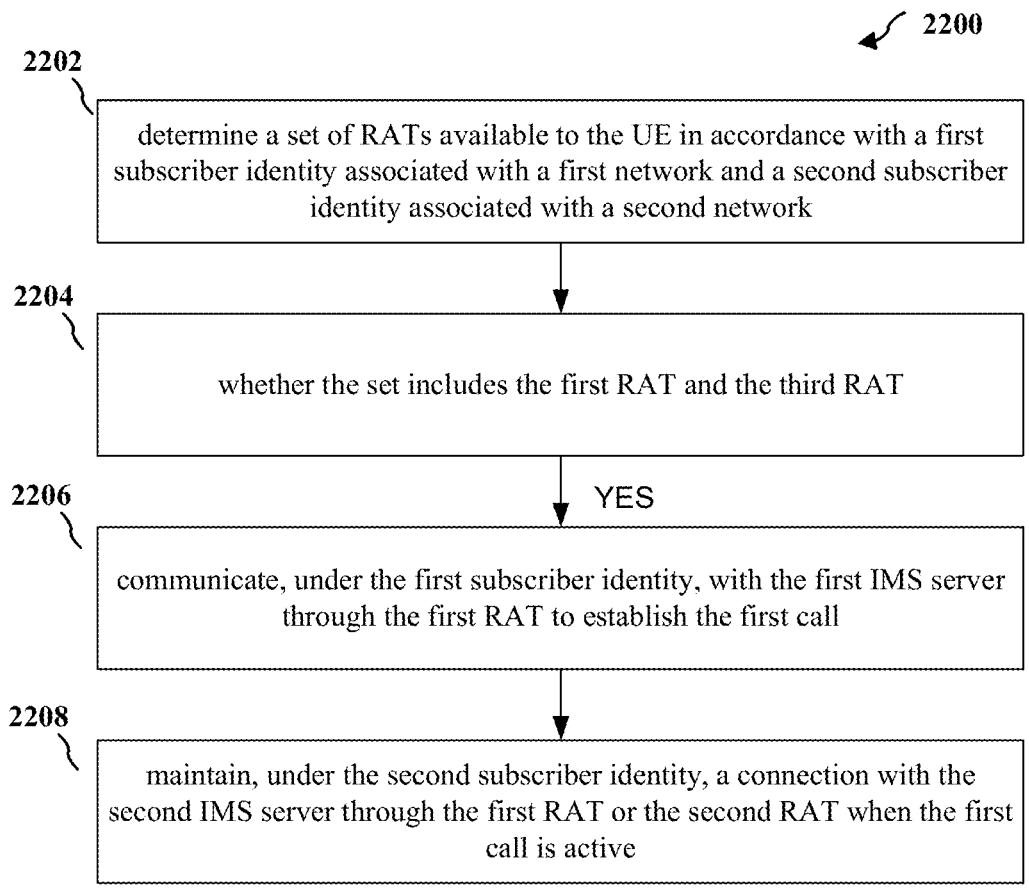
FIG. 22 is a flow chart illustrating a method (process) of wireless communication of a UE.

FIG. 22 is a flow chart 2200 illustrating a method (process) of wireless communication of a UE 702. The method may be performed by a UE (e.g., the UE 702, the apparatus 2502/2502'). At operation 2202, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 2204, the UE 702 determines whether the set includes the first RAT and the third RAT. If the set includes the first RAT and the third RAT, then the method (process) proceeds to operation 2206, otherwise the method (process) ends.

At operation 2206, the UE 702 communicates, under the first subscriber identity, with the first IMS server through the first RAT to establish the first call.

At operation 2208, the UE 702 maintains, under the second subscriber identity, a connection with the second IMS server through the first RAT (e.g., RAT-1 826) or the second RAT (e.g., RAT-2 822) when the first call is active.

Figure 23:
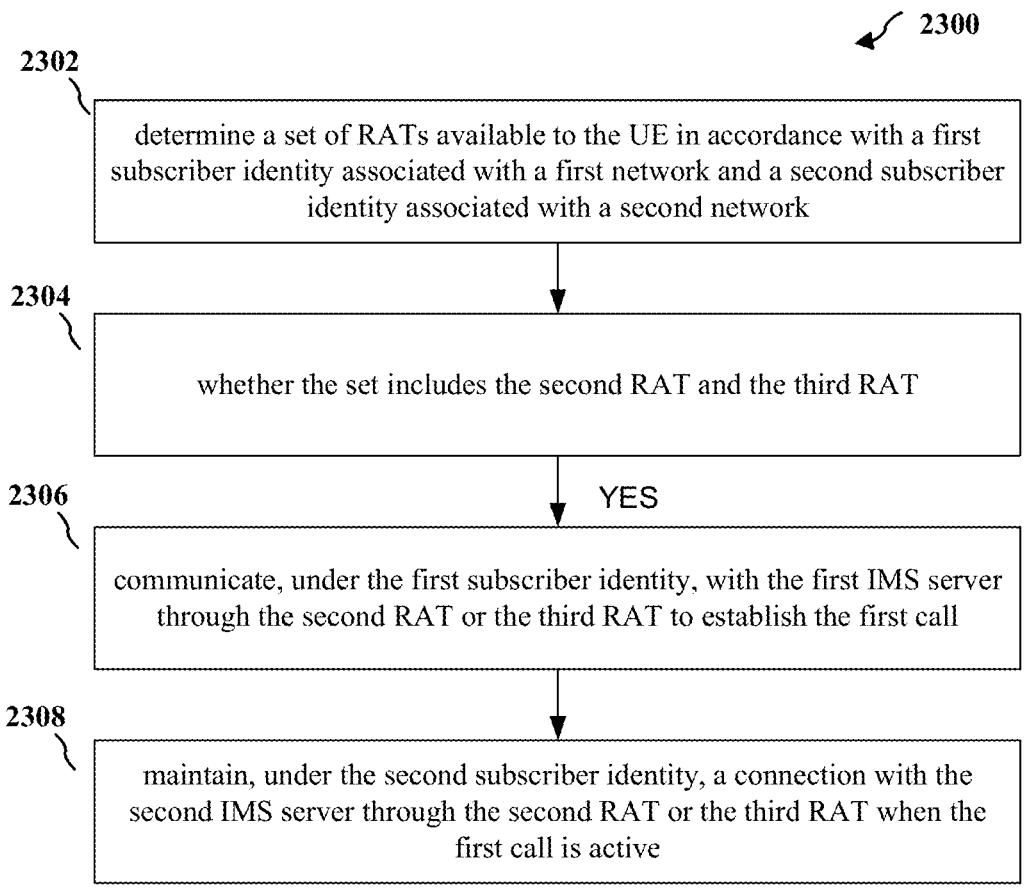
FIG. 23 is a flow chart illustrating a method (process) of wireless communication of a UE.

FIG. 23 is a flow chart 2300 illustrating a method (process) of wireless communication of a UE 702. The method may be performed by a UE (e.g., the UE 702, the apparatus 2502/2502'). At operation 2302, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 2304, the UE 702 determines whether the set includes the second RAT and the third RAT. If the set includes the second RAT and the third RAT, then the method (process) proceeds to operation 2306, otherwise the method (process) ends.

At operation 2306, the UE 702 communicates, under the first subscriber identity, with the first IMS server through the second RAT or the third RAT (e.g., RAT-3 824) to establish the first call.

At operation 2308, the UE 702 maintains, under the second subscriber identity, a connection with the second IMS server through the second RAT (e.g., RAT-2 822) or the third RAT (e.g., RAT-3 824) when the first call is active.

FIG. 23 is a flow chart 2300 illustrating a method (process) of wireless communication of a UE 702. The method may be performed by a UE (e.g., the UE 702, the apparatus 2502/2502'). At operation 2302, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 2304, the UE 702 determines whether the set includes the second RAT and the third RAT. If the set includes the second RAT and the third RAT, then the method (process) proceeds to operation 2306, otherwise the method (process) ends.

At operation 2306, the UE 702 communicates, under the first subscriber identity, with the first IMS server through the second RAT or the third RAT (e.g., RAT-3 824) to establish the first call.

At operation 2308, the UE 702 maintains, under the second subscriber identity, a connection with the second IMS server through the second RAT (e.g., RAT-2 822) or the third RAT (e.g., RAT-3 824) when the first call is active.

Figure 24:
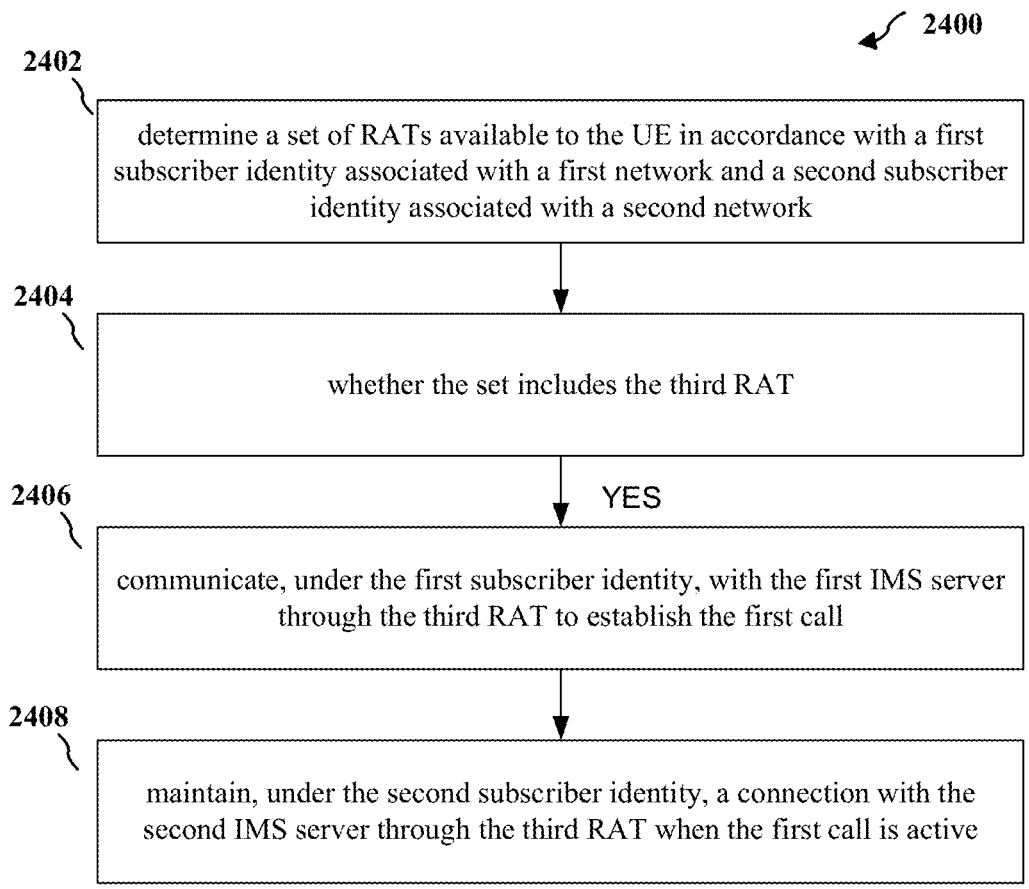
FIG. 24 is a flow chart illustrating a method (process) of wireless communication of a UE.

FIG. 24 is a flow chart 2400 illustrating a method (process) of wireless communication of a UE 702. The method may be performed by a UE (e.g., the UE 702, the apparatus 2502/2502'). At operation 2402, the UE 702 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792).

At operation 2404, the UE 702 determines whether the set includes the third RAT. If the set includes the third RAT, then the method (process) proceeds to operation 2406, otherwise the method (process) ends.

At operation 2406, the UE 702 communicates, under the first subscriber identity, with the first IMS server through the third RAT (e.g., RAT-3 824) to establish the first call.

At operation 2408, the UE 702 maintains, under the second subscriber identity, a connection with the second IMS server through the third RAT (e.g., RAT-3 824) when the first call is active.

Figure 25:
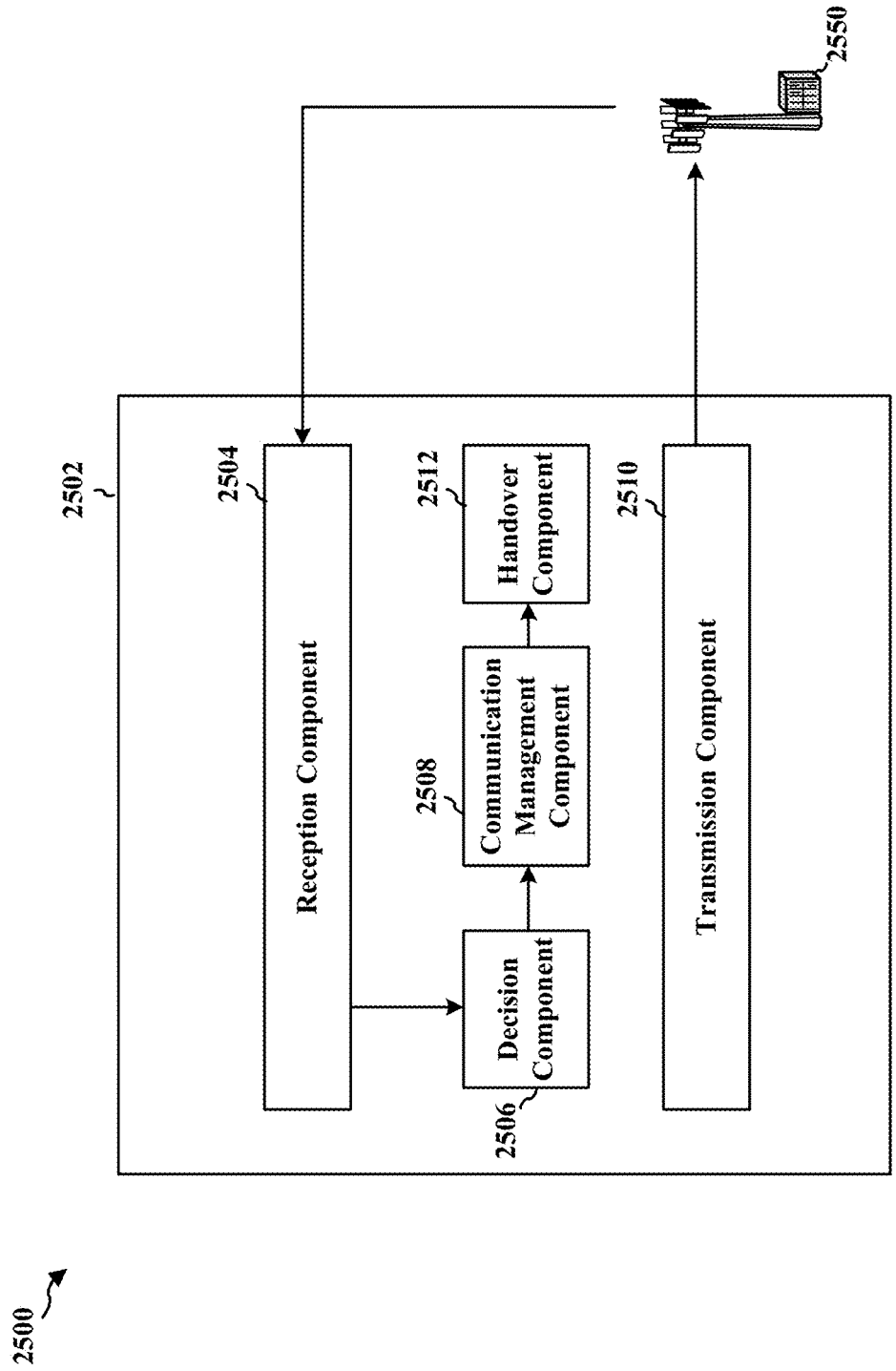
FIG. 25 is a conceptual data flow diagram illustrating the data flow between different components/means in an exemplary apparatus.

FIG. 25 is a conceptual data flow diagram 2500 illustrating the data flow between different components/means in an exemplary apparatus 2502. The apparatus 2502 may be a UE. The apparatus 2502 includes a reception component 2504, a decision component 2506, a communication management component 2508, a handover component 2512, and a transmission component 2510.

The decision component 2506 determine a set of RATs available to the UE 702 in accordance with a first subscriber identity (e.g., SIM1 702-1) associated with a first network (e.g., the mobile network 791) and a second subscriber identity (e.g., SIM2 702-2) associated with a second network (e.g., the mobile network 792). In certain configurations, the first RAT is selected based on at least one of a call quality, a cost to make the first call, a power consumption of the UE, and a handover rate.

The decision component 2506 determines whether the set includes a first RAT accessing a base station (e.g., the base station 704-1) in the first network, a second RAT accessing a base station (e.g., the base station 704-2) in the second network, and a third RAT accessing an access point of a WLAN (e.g., the WLAN network 716).

When the set includes a first RAT accessing a base station in the first network, a second RAT accessing a base station in the second network, and a third RAT accessing an access point of a WLAN, then the method (process) proceeds to operation 1506, otherwise the method (process) ends.

The communication management component 2508 selects, in a first performance configuration, the first RAT to establish a first call under the first subscriber identity (e.g., the SIM1 702-1).

The communication management component 2508 maintains, under the first subscriber identity, a connection with the first IMS server (e.g., the IMS service 714-1) through the first RAT.

The communication management component 2508 maintains, under the second subscriber identity, the connection with the second IMS server (e.g., the IMS service 714-2) through the second RAT (e.g., the RAT-2 822).

The communication management component 2508 communicates, under the first subscriber identity, with a first IMS server (e.g., the IMS service 714-1) of the first network through the first RAT to establish the first call.

The handover component 2512 hands over the connection with the second IMS server (e.g., the IMS service 714-2) from the second RAT to the first RAT or the third RAT.

The communication management component 2508 maintains, under the second subscriber identity, a connection with a second IMS server (e.g., the IMS service 714-2) of the second network through the first RAT (e.g., the RAT-1 826) or the third RAT (e.g., the RAT-3 824) when the first call is active.

The communication management component 2508 receives, through the first RAT and under the first subscriber identity, a call invitation to establish the first call.

The communication management component 2508 selects, in a second performance configuration, the third RAT to establish the first call under the first subscriber identity.

The handover component 2512 hands over the connection under the first subscriber identity with the first IMS server from the first RAT to the third RAT (e.g., RAT-3 824).

The communication management component 2508 communicates, under the first subscriber identity, with the first IMS server through the third RAT (e.g., RAT-3 824) to establish the first call.

The decision component 2506 determines whether the connection under the second subscriber identity with the second IMS server is maintained through the third RAT (e.g., RAT-3 824). If the connection under the second subscriber identity with the second IMS server is maintained through the third RAT (e.g., RAT-3 824), then proceed to operation 1614, otherwise the method (process) ends.

The communication management component 2508 receives a call invitation to establish a second call under the second subscriber identity through the third RAT (e.g., RAT-3 824).

The communication management component 2508 holds the first call.

The handover component 2512 hands over the connection under the second subscriber identity with the second IMS server from the third RAT (e.g., RAT-3 824) to the second RAT (e.g., RAT-2 822).

The communication management component 2508 communicates, under the second subscriber identity, with the second IMS server through the second RAT (e.g., RAT-2 822) to establish the second call.

The handover component 2512 hands over the holding of the first call from the first RAT to the third RAT.

The decision component 2506 determines whether the set includes the first RAT. If the set includes the first RAT, then the method (process) proceeds, otherwise the method (process) ends.

The communication management component 2508 communicates, under the first subscriber identity, with the first IMS server through the first RAT to establish the first call.

The communication management component 2508 maintains, under the second subscriber identity, a connection with the second IMS server through the first RAT (e.g., RAT-1 826) when the first call is active.

The decision component 2506 determines whether the set includes the first RAT and the second RAT. If the set includes the first RAT and the second RAT, then the method (process) proceeds, otherwise the method (process) ends.

The communication management component 2508 communicates, under the first subscriber identity, with the first IMS server through the first RAT to establish the first call.

The communication management component 2508 maintains, under the second subscriber identity, a connection with the second IMS server through the first RAT (e.g., RAT-1 826) when the first call is active.

The communication management component 2508 receives a call invitation to establish a second call under the second subscriber identity through the first RAT (e.g., RAT-1 826).

The communication management component 2508 holds the first call.

The handover component 2512 hands over the connection under the second subscriber identity with the second IMS server from the first RAT (e.g., RAT-1 826) to the second RAT (e.g., RAT-2 822).

The communication management component 2508 communicates, under the second subscriber identity, with the second IMS server through the second RAT to establish the second call.

The handover component 2512 hands over the holding of the first call from the first RAT to the second RAT.

The decision component 2506 determines whether the set includes the second RAT. If the set includes the second RAT, then the method (process) proceeds to operation 2106, otherwise the method (process) ends.

The communication management component 2508 communicates, under the first subscriber identity, with the first IMS server through the second RAT to establish the first call.

The communication management component 2508 maintains, under the second subscriber identity, a connection with the second IMS server through the second RAT (e.g., RAT-2 822) when the first call is active.

The decision component 2506 determines whether the set includes the first RAT and the third RAT. If the set includes the first RAT and the third RAT, then the method (process) proceeds to operation 2206, otherwise the method (process) ends.

The communication management component 2508 communicates, under the first subscriber identity, with the first IMS server through the first RAT to establish the first call.

The communication management component 2508 maintains, under the second subscriber identity, a connection with the second IMS server through the first RAT (e.g., RAT-1 826) or the second RAT (e.g., RAT-2 822) when the first call is active.

The decision component 2506 determines whether the set includes the second RAT and the third RAT. If the set includes the second RAT and the third RAT, then the method (process) proceeds, otherwise the method (process) ends.

The communication management component 2508 communicates, under the first subscriber identity, with the first IMS server through the second RAT or the third RAT (e.g., RAT-3 824) to establish the first call.

The communication management component 2508 maintains, under the second subscriber identity, a connection with the second IMS server through the second RAT (e.g., RAT-2 822) or the third RAT (e.g., RAT-3 824) when the first call is active.

The decision component 2506 determines whether the set includes the second RAT and the third RAT. If the set includes the second RAT and the third RAT, then the method (process) proceeds, otherwise the method (process) ends.

The communication management component 2508 communicates, under the first subscriber identity, with the first IMS server through the second RAT or the third RAT (e.g., RAT-3 824) to establish the first call.

The communication management component 2508 maintains, under the second subscriber identity, a connection with the second IMS server through the second RAT (e.g., RAT-2 822) or the third RAT (e.g., RAT-3 824) when the first call is active.

The decision component 2506 determines whether the set includes the third RAT. If the set includes the third RAT, then the method (process) proceeds to operation 2406, otherwise the method (process) ends.

The communication management component 2508 communicates, under the first subscriber identity, with the first IMS server through the third RAT (e.g., RAT-3 824) to establish the first call.

The communication management component 2508 maintains, under the second subscriber identity, a connection with the second IMS server through the third RAT (e.g., RAT-3 824) when the first call is active.

Figure 26:
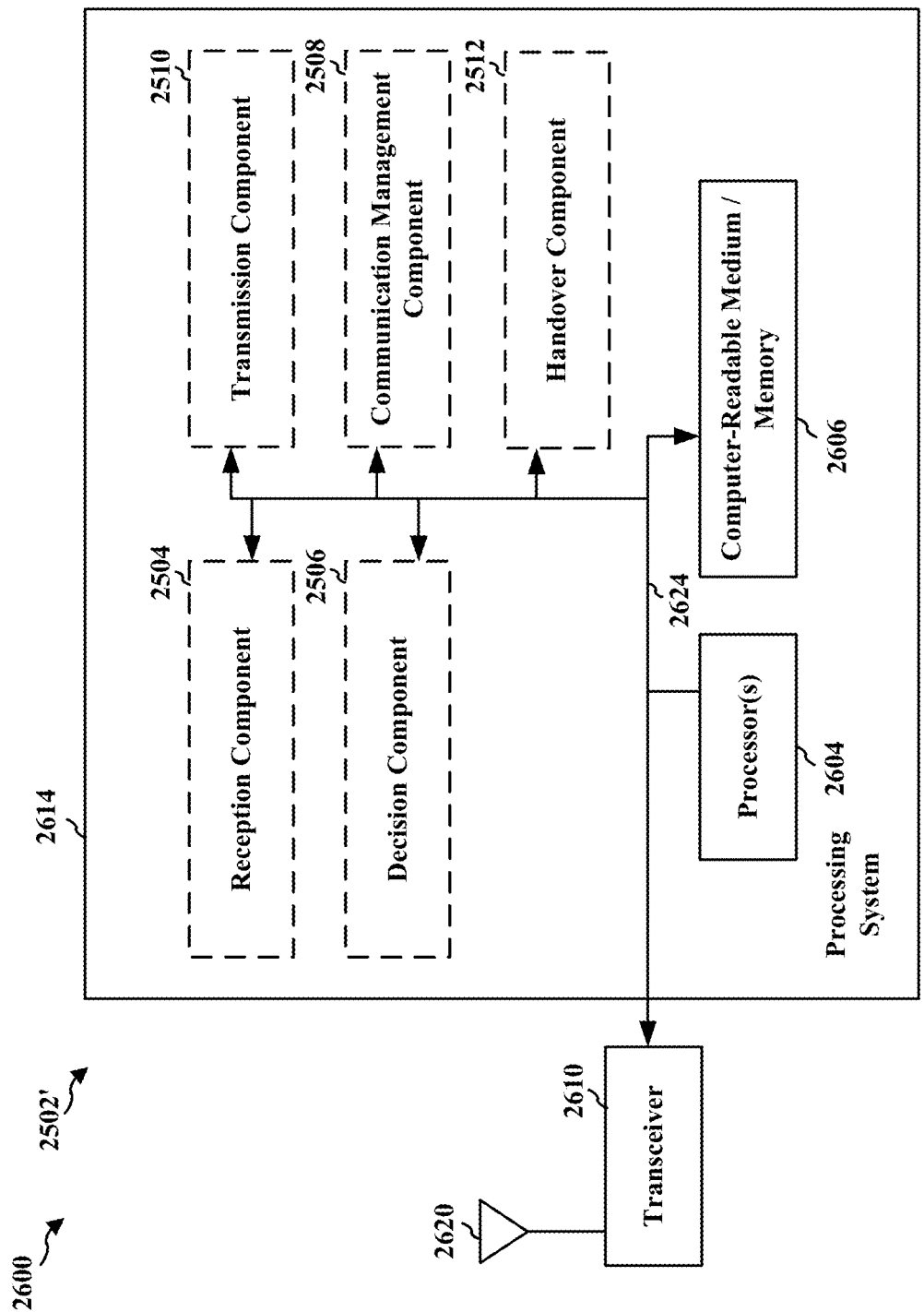
FIG. 26 is a diagram illustrating an example of a hardware implementation for an apparatus employing a processing system.

FIG. 26 is a diagram 2600 illustrating an example of a hardware implementation for an apparatus 2502' employing a processing system 2614. The apparatus 2502' may be a UE. The processing system 2614 may be implemented with a bus architecture, represented generally by a bus 2624. The bus 2624 may include any number of interconnecting buses and bridges depending on the specific application of the processing system 2614 and the overall design constraints. The bus 2624 links together various circuits including one or more processors and/or hardware components, represented by one or more processors 2604, the reception component 2504, the decision component 2506, the communication management component 2508, the transmission component 2510, the handover component 2512, and a computer-readable medium/memory 2606. The bus 2624 may also link various other circuits such as timing sources, peripherals, voltage regulators, and power management circuits, etc.

The processing system 2614 may be coupled to a transceiver 2610, which may be one or more of the transceivers 254. The transceiver 2610 is coupled to one or more antennas 2620, which may be the communication antennas 252.

The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception component 2504. In addition, the transceiver 2610 receives information from the processing system 2614, specifically the transmission component 2510, and based on the received information, generates a signal to be applied to the one or more antennas 2620.

The processing system 2614 includes one or more processors 2604 coupled to a computer-readable medium/memory 2606. The one or more processors 2604 are responsible for general processing, including the execution of software stored on the computer-readable medium/memory 2606. The software, when executed by the one or more processors 2604, causes the processing system 2614 to perform the various functions described supra for any particular apparatus. The computer-readable medium/memory 2606 may also be used for storing data that is manipulated by the one or more processors 2604 when executing software. The processing system 2614 further includes at least one of the reception component 2504, the decision component 2506, the communication management component 2508, the transmission component 2510, and the handover component 2512. The components may be software components running in the one or more processors 2604, resident/stored in the computer readable medium/memory 2606, one or more hardware components coupled to the one or more processors 2604, or some combination thereof. The processing system 2614 may be a component of the UE 250 and may include the memory 260 and/or at least one of the TX processor 268, the RX processor 256, and the communication processor 259.

In one configuration, the apparatus 2502/apparatus 2502' for wireless communication includes means for performing each of the operations of FIG. 13 and FIG. 14. The aforementioned means may be one or more of the aforementioned components of the apparatus 2502 and/or the processing system 2614 of the apparatus 2502' configured to perform the functions recited by the aforementioned means.

As described supra, the processing system 2614 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining a set of radio access technologies (RATs) available to the UE in accordance with a first subscriber identity associated with a first network and a second subscriber identity associated with a second network; and
   when the set includes a first RAT accessing a base station in the first network, a second RAT accessing a base station in the second network, and a third RAT accessing an access point of a wireless local area network (WLAN):
      selecting, in a first performance configuration, the first RAT to establish a first call under the first subscriber identity;
      communicating, under the first subscriber identity, with a first IP Multimedia Subsystem (IMS) server of the first network through the first RAT to establish the first call; and when the first call is active:
 maintaining, under the second subscriber identity, a connection with a second IMS server of the second network through the first RAT or the third RAT;
 receiving a call invitation to establish a second call under the second subscriber identity through the first RAT or the third RAT;
 holding the first call;
 handing over the connection under the second subscriber identity with the second IMS server from the first RAT or the third RAT to the second RAT; and
 communicating, under the second subscriber identity, with the second IMS server through the second RAT to establish the second call.

2. The method of claim 1, wherein the first RAT is selected based on at least one of a call quality, a cost to make the first call, a power consumption of the UE, and a handover rate.

3. The method of claim 1, further comprising:
 prior to the communicating with the first IMS server to establish the first call:
  maintaining, under the first subscriber identity, a connection with the first IMS server through the first RAT; and
  maintaining, under the second subscriber identity, the connection with the second IMS server through the second RAT or the third RAT.

4. The method of claim 1, further comprising:
 subsequent to the communicating with the first IMS server to establish the first call:
  handing over the connection with the second IMS server from the second RAT to the first RAT or the third RAT.

5. The method of claim 1, further comprising:
 receiving, through the first RAT and under the first subscriber identity, a call invitation to establish the first call;
 selecting, in a second performance configuration, the third RAT to establish the first call under the first subscriber identity;
 handing over the connection under the first subscriber identity with the first IMS server from the first RAT to the third RAT; and
 communicating, under the first subscriber identity, with the first IMS server through the third RAT to establish the first call.

6. The method of claim 1, further comprising:
 handing over the holding of the first call from the first RAT to the second RAT or the third RAT.

7. The method of claim 1, further comprising when the set includes the first RAT:
 communicating, under the first subscriber identity, with the first IMS server through the first RAT to establish the first call; and
 maintaining, under the second subscriber identity, a connection with the second IMS server through the first RAT or the third RAT when the first call is active.

8. The method of claim 1, further comprising when the set includes the first RAT and the second RAT:
 communicating, under the first subscriber identity, with the first IMS server through the first RAT to establish the first call; and
 maintaining, under the second subscriber identity, a connection with the second IMS server through the first RAT when the first call is active.

9. The method of claim 8, further comprising:
 receiving a call invitation to establish a second call under the second subscriber identity through the first RAT;
 holding the first call;
 handing over the connection under the second subscriber identity with the second IMS server from the first RAT to the second RAT; and
 communicating, under the second subscriber identity, with the second IMS server through the second RAT to establish the second call.

10. The method of claim 9, further comprising:
 handing over the holding of the first call from the first RAT to the second RAT.

11. The method of claim 1, when the set includes the second RAT:
 communicating, under the first subscriber identity, with the first IMS server through the second RAT to establish the first call; and
 maintaining, under the second subscriber identity, a connection with the second IMS server through the second RAT when the first call is active.

12. The method of claim 1, when the set includes the first RAT and the third RAT:
 communicating, under the first subscriber identity, with the first IMS server through the first RAT to establish the first call; and
 maintaining, under the second subscriber identity, a connection with the second IMS server through the first RAT or the third RAT when the first call is active.

13. The method of claim 1, when the set includes the second RAT and the third RAT:
 communicating, under the first subscriber identity, with the first IMS server through the second RAT or the third RAT to establish the first call; and
 maintaining, under the second subscriber identity, a connection with the second IMS server through the second RAT or the third RAT when the first call is active.

14. The method of claim 1, when the set includes the third RAT:
 communicating, under the first subscriber identity, with the first IMS server through the third RAT to establish the first call; and
 maintaining, under the second subscriber identity, a connection with the second IMS server through the third RAT when the first call is active.

15. An apparatus for wireless communication, the apparatus being a user equipment (UE), comprising:
 a memory; and
 at least one processor coupled to the memory and configured to:
  determine a set of radio access technologies (RATs) available to the UE in accordance with a first subscriber identity associated with a first network and a second subscriber identity associated with a second network; and
  when the set includes a first RAT accessing a base station in the first network, a second RAT accessing a base station in the second network, and a third RAT accessing an access point of a wireless local area network (WLAN):
   select, in a first performance configuration, the first RAT to establish a first call under the first subscriber identity;
   communicate, under the first subscriber identity, with a first IP Multimedia Subsystem (IMS) server of the first network through the first RAT to establish the first call; and when the first call is active:
　maintain, under the second subscriber identity, a connection with a second IMS server of the second network through the first RAT or the third RAT;
　receive a call invitation to establish a second call under the second subscriber identity through the first RAT or the third RAT;
　hold the first call;
　hand over the connection under the second subscriber identity with the second IMS server from the first RAT or the third RAT to the second RAT; and
　communicate, under the second subscriber identity, with the second IMS server through the second RAT to establish the second call.

16. The apparatus of claim 15, wherein the first RAT is selected based on at least one of a call quality, a cost to make the first call, a power consumption of the UE, and a handover rate.

17. The apparatus of claim 15, wherein the at least one processor is further configured to:
　prior to the communicating with the first IMS server to establish the first call:
　　maintain, under the first subscriber identity, a connection with the first IMS server through the first RAT; and
　　maintain, under the second subscriber identity, the connection with the second IMS server through the second RAT or the third RAT.

18. The apparatus of claim 15, wherein the at least one processor is further configured to:
　subsequent to the communicating with the first IMS server to establish the first call:
　　hand over the connection with the second IMS server from the second RAT to the first RAT or the third RAT.

19. The apparatus of claim 15, wherein the at least one processor is further configured to:
　receive, through the first RAT and under the first subscriber identity, a call invitation to establish the first call;
　select, in a second performance configuration, the third RAT to establish the first call under the first subscriber identity;
　hand over the connection under the first subscriber identity with the first IMS server from the first RAT to the third RAT; and
　communicate, under the first subscriber identity, with the first IMS server through the third RAT to establish the first call.

20. A non-transitory computer-readable medium storing computer executable code for wireless communication of a user equipment (UE), comprising code to:
　determine a set of radio access technologies (RATs) available to the UE in accordance with a first subscriber identity associated with a first network and a second subscriber identity associated with a second network; and
　when the set includes a first RAT accessing a base station in the first network, a second RAT accessing a base station in the second network, and a third RAT accessing an access point of a wireless local area network (WLAN):
　　select, in a first performance configuration, the first RAT to establish a first call under the first subscriber identity;
　　communicate, under the first subscriber identity, with a first IP Multimedia Subsystem (IMS) server of the first network through the first RAT to establish the first call; and
　　when the first call is active:
　　　maintain, under the second subscriber identity, a connection with a second IMS server of the second network through the first RAT or the third RAT;
　　　receive a call invitation to establish a second call under the second subscriber identity through the first RAT or the third RAT;
　　　hold the first call;
　　　hand over the connection under the second subscriber identity with the second IMS server from the first RAT or the third RAT to the second RAT; and
　　　communicate, under the second subscriber identity, with the second IMS server through the second RAT to establish the second call.

* * * * *